United States Patent
Hryniw

(10) Patent No.: US 12,270,726 B2
(45) Date of Patent: Apr. 8, 2025

(54) HYPERPLANE SEARCH-BASED VEHICLE TEST

(71) Applicant: GM Cruise Holdings LLC, San Francisco, CA (US)

(72) Inventor: James Hryniw, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 344 days.

(21) Appl. No.: 17/881,520

(22) Filed: Aug. 4, 2022

(65) Prior Publication Data
US 2024/0044745 A1    Feb. 8, 2024

(51) Int. Cl.
*G06N 20/10* (2019.01)
*B60W 60/00* (2020.01)
*G01M 17/007* (2006.01)

(52) U.S. Cl.
CPC .......... *G01M 17/007* (2013.01); *B60W 60/00* (2020.02); *G06N 20/10* (2019.01)

(58) Field of Classification Search
CPC .............. G01M 17/007; B60W 60/00; B60W 2050/0028; B60W 30/12; B60W 60/001; G06N 20/10
See application file for complete search history.

(56) References Cited

FOREIGN PATENT DOCUMENTS

DE    102022107845 A1 * 10/2023
WO    WO-2023045936 A1 *  3/2023

OTHER PUBLICATIONS

Markofsky Moritz, Apr. 1, 2024, English Machine Translation_ DE102022107845 A1 provided by Patent Translate by EPO and Google (Year: 2022).*
Zhang Fang, Sep. 22, 2021, English Machine Translation_ WO2023045936 A1 provided by Patent Translate by EPO and Google (Year: 2021).*

* cited by examiner

*Primary Examiner* — Ashley L Redhead, Jr.

(57) ABSTRACT

Systems and methods for measuring autonomous vehicle (AV) capabilities in a simulation environment are provided. A method includes selecting, by a computer-implemented system, a first plurality of sampling points in an N-dimensional parameter space associated with a vehicle capability test, classifying, by the computer-implemented system, each sampling point of the first plurality of sampling points into a first class based on a vehicle passing a test scenario associated with the respective sampling point; or a second class based on the vehicle failing the test scenario associated with the respective sampling point; and determining, by the computer-implemented system based on the classifying, a capability of the vehicle. The classifying can include computing a first hyperplane in the N-dimensional parameter space to separate the first plurality of sampling points into the first class and the second class.

20 Claims, 9 Drawing Sheets

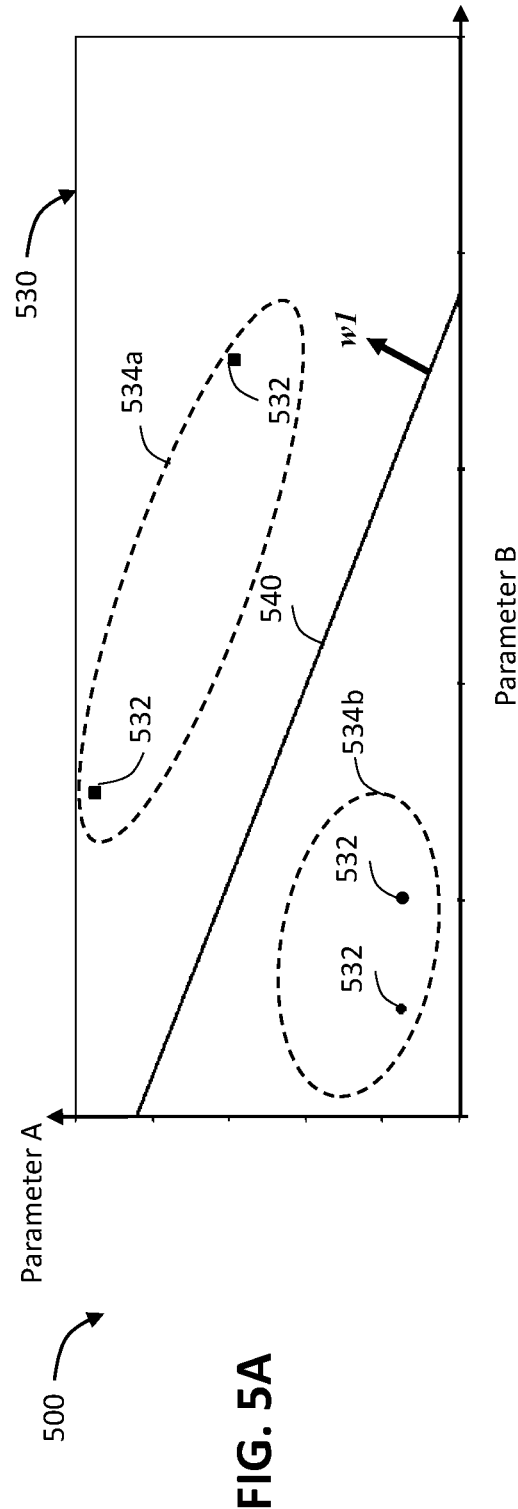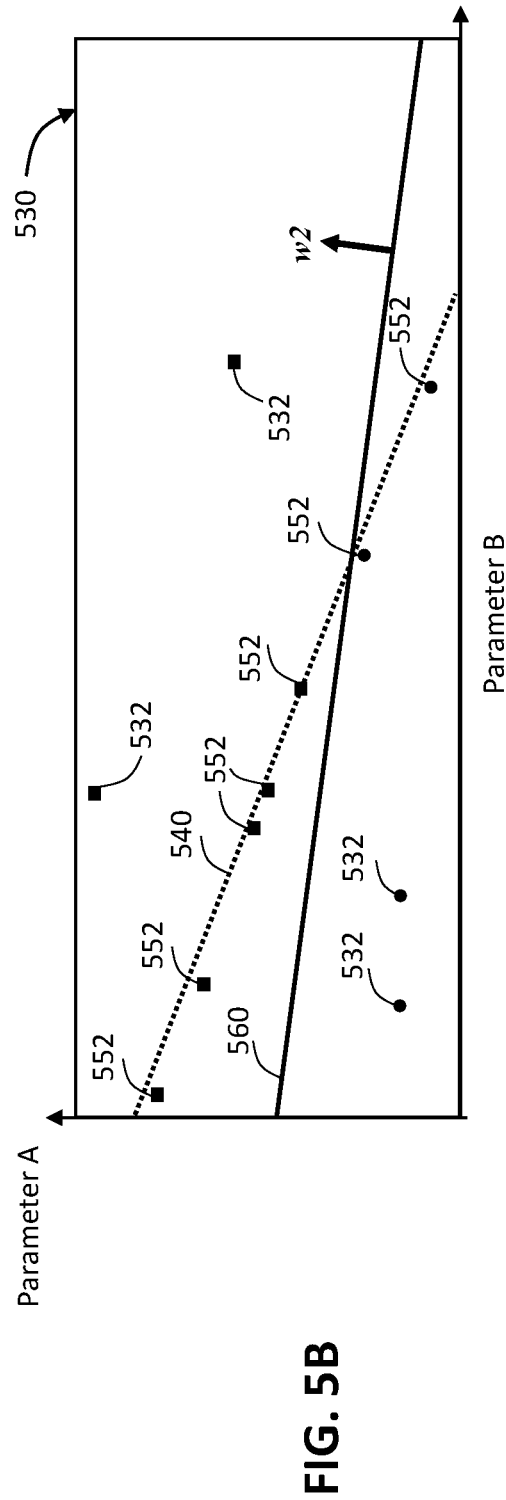
FIG. 5A
FIG. 5B

HYPERPLANE SEARCH-BASED VEHICLE TEST

BACKGROUND

1. Technical Field

The present disclosure generally relates to autonomous vehicle and, more specifically, to hyperplane search-based vehicle testing.

2. Introduction

Autonomous vehicles, also known as self-driving cars, driverless vehicles, and robotic vehicles, may be vehicles that use multiple sensors to sense the environment and move without human input. Automation technology in the autonomous vehicles may enable the vehicles to drive on roadways and to accurately and quickly perceive the vehicle's environment, including obstacles, signs, and traffic lights. Autonomous technology may utilize map data that can include geographical information and semantic objects (such as parking spots, lane boundaries, intersections, crosswalks, stop signs, traffic lights) for facilitating the vehicles in making driving decisions. The vehicles can be used to pick up passengers and drive the passengers to selected destinations. The vehicles can also be used to pick up packages and/or other goods and deliver the packages and/or goods to selected destinations.

BRIEF DESCRIPTION OF THE DRAWINGS

The various advantages and features of the present technology will become apparent by reference to specific implementations illustrated in the appended drawings. A person of ordinary skill in the art will understand that these drawings show only some examples of the present technology and would not limit the scope of the present technology to these examples. Furthermore, the skilled artisan will appreciate the principles of the present technology as described and explained with additional specificity and detail through the use of the accompanying drawings in which:

FIG. 5A illustrates a hyperplane search-based AV capability test during a first iteration, according to some examples of the present disclosure;

FIG. 5B illustrates a hyperplane search-based AV capability test during a second iteration, according to some examples of the present disclosure;

DETAILED DESCRIPTION

Figure 1:
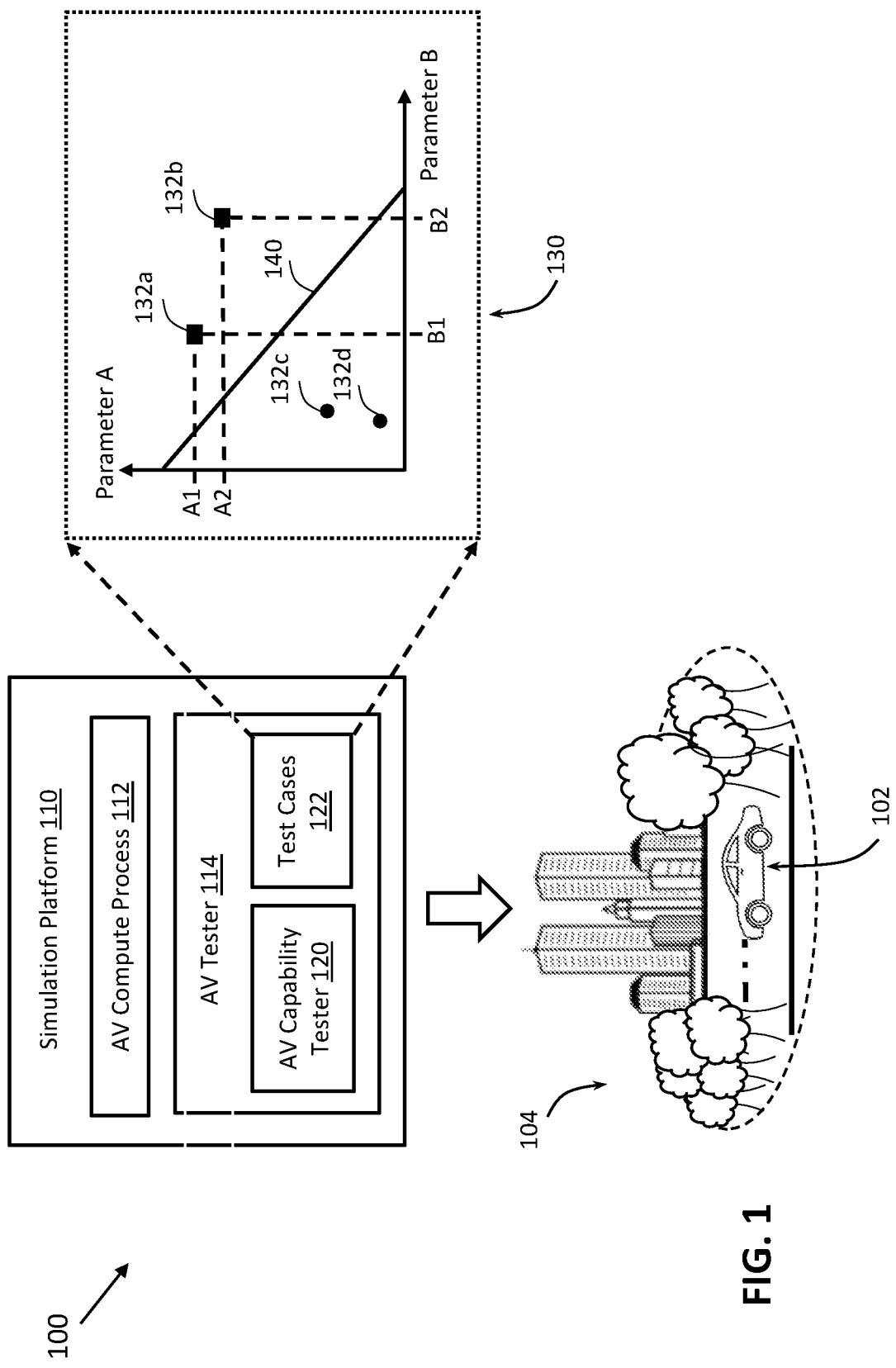
FIG. 1 illustrates a simulation environment for autonomous driving in which hyperplane searches may be implemented for autonomous vehicle (AV) capability testing, according to some examples of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Autonomous vehicles (AVs) can provide many benefits. For instance, AVs may have the potential to transform urban living by offering opportunity for efficient, accessible and affordable transportation. An AV may be equipped with various sensors to sense an environment surrounding the AV and collect information (e.g., sensor data) to assist the AV in making driving decisions. To that end, the collected information or sensor data may be processed and analyzed to determine a perception of the AV's surroundings, extract information related to navigation, and predict future motions of the AV and/or other traveling agents in the AV's vicinity. The predictions may be used to plan a path for the AV (e.g., from a starting position to a destination). As part of planning, the AV may access map information and localize itself based on location information (e.g., from location sensors) and the map information. Subsequently, instructions can be sent to a controller to control the AV (e.g., for steering, accelerating, decelerating, braking, etc.) according to the planned path.

The operations of perception, prediction, planning, and control at an AV may be implemented using a combination of hardware and software components. For instance, an AV stack or AV compute process performing the perception, prediction, planning, and control may be implemented as software code or firmware code. The AV stack or AV compute process may be executed on processor(s) (e.g., general processors, central processors (CPUs), graphical processors (GPUs), digital signal processors (DSPs), ASIC, etc.) and/or any other hardware processing components on the AV. Additionally, the AV stack or AV compute process may communicate with various hardware components (e.g., on-board sensors and control system of the AV) and/or with an AV infrastructure over a network.

Training and testing AVs in the physical world can be challenging. For instance, to provide good testing coverage, an AV may be trained and tested to respond to various driving scenarios (e.g., millions of physical road test scenarios) before it can be deployed in a real-life roadway system. As such, it may be costly and time-consuming to train and test AVs on physical roads. Furthermore, there may be test cases that are difficult to create or too dangerous to cover in the physical world. Accordingly, it may be desirable to train and validate AVs in a simulation environment.

A simulator may simulate (or mimic) real-world conditions (e.g., roads, lanes, buildings, obstacles, other traffic participants, trees, lighting conditions, weather conditions, etc.) so that an AV may be tested in a virtual environment that is close to a real physical world. Testing AVs in a simulator can be more efficient and allow for creation of specific traffic scenarios. To that end, the AV compute process implementing the perception, prediction, planning, and control algorithms can be developed, validated, and fine-tuned in a simulation environment. More specifically, the AV compute process may be executed in an AV simulator (simulating various traffic scenarios), and the AV simulator may compute metrics related to AV driving decisions, AV response time, etc. to determine the performance of an AV to be deployed with the AV compute process.

In some examples, it may be desirable to understand the capabilities of an AV so that a planned path is drivable (e.g., navigable, maneuverable) by the AV. As an example, a path may include tight turns (e.g., right turns). Accordingly, it may be useful for an AV planning stack to have information about the maximum curvature that the AV may be capable of maneuvering. As another example, a path may include a narrow gap, for example, between buildings and/or parked vehicles. Accordingly, it may be useful for an AV planning stack (e.g., a compute process) of the AV to have information about the minimum gap width that the AV may be capable of driving through.

Accordingly, the present disclosure provides efficient mechanisms for searching and defining vehicle (e.g., AV) capabilities in a way that the vehicle capabilities can be represented by quantifiable measures or metrics. As used herein, a quantifiable measure or metric for a particular vehicle capability may refer to a set of parameters that define the particular vehicle capability. As an example, the capability of a vehicle in making a tight turn can be defined by two parameters, where a first parameter may be a curvature of a path and a second parameter may be a distance between the vehicle's position to the curvature. As another example, the capability of a vehicle in driving through a narrow gap can be defined by three parameters, where a first parameter may be a width of the gap, a second parameter may be a lateral distance, and a third parameter may be a longitudinal distance between the vehicle's position to the gap.

To determine the best combination(s) of parameters representative of the particular vehicle capability, a finite parameter space can be defined with dimensions corresponding to the set of test parameters and a search may be performed in the finite parameter space. More specifically, an N-dimensional parameter space, where N can be any positive integer (e.g., 1, 2, 3, 4 or more), can be defined for testing the particular vehicle capability. Each dimension of the N-dimensional parameter space may correspond to a different one of the test parameters in the set. Each sampling point in the N-dimensional parameter space may define a test scenario (or test case) for the vehicle capability test. In general, a vehicle may pass in some of the test scenarios and fail in others. The best combination(s) of parameters representative of the particular vehicle capability may refer to the combination(s) of parameters at a pass/fail boundary in which the vehicle may pass all test scenarios associated with sampling points on one side of the boundary and fail all test cases associated with sampling points on the other side of the boundary. While the vehicle capability can be found by sampling the entire N-dimensional parameter space densely (e.g., by executing a vehicle compute process for each combination of test parameters in the N-dimensional space to determine a pass/fail result), which can be time-consuming and costly, the disclosed embodiments utilize a search technique that can sample the N-dimensional parameter space sparsely to find a pass/fail boundary in the N-dimensional space. To that end, the pass/fail boundary can be represented by a hyperplane in the N-dimensional parameter space, and the vehicle capability test may be determined by searching (e.g., iteratively) for a best-fit hyperplane that separates sampling points associated with passed test results from sampling points associated with failed test results in the N-dimensional parameter space.

A hyperplane is a decision boundary that classifies data points in a data space (e.g., a multi-dimensional space). The dimension of the hyperplane is one less than the dimension of the data space. For instance, if the data space has 2 dimensions, then the hyperplane in the data space is a line. If the data space has 3 dimensions, then the hyperplane becomes a two-dimensional plane. Data points falling on either side of the hyperplane can be attributed to different classes.

In an aspect of the present disclosure, a computer-implemented system may generate a first plurality of vehicle test scenarios, each corresponding to a different one of a first plurality of sampling points in an N-dimensional parameter space associated with a vehicle capability, where N is a positive integer (e.g., 1, 2, 3, 4, 5 or more). The computer-implemented system may execute a vehicle process (e.g., an AV compute process, an AV stack, and/or an AV planning stack) in each vehicle test scenario of the first plurality of vehicle test scenarios to generate a first test result for the respective vehicle test scenario. The computer-implemented system may compute a first hyperplane in the N-dimensional parameter space based on the first test results. For instance, the first hyperplane may separate (or classify) the first plurality of sampling points into a first group (or class) of sampling points and a second group (or class) of sampling points. The first group of sampling points may correspond to vehicle test scenarios in which the vehicle compute process fails. The second group of sampling points may correspond to test scenarios in which the vehicle compute process passes.

Subsequently, the computer-implemented system may generate a second plurality of vehicle test scenarios based on the first hyperplane, where each of the second plurality of test scenarios may correspond to a different one of a second plurality of sampling points in the N-dimensional parameter space. The computer-implemented system may repeat the execution of the vehicle compute process in each of the second plurality of vehicle test scenarios to generate a second test result for the respective vehicle test scenario and compute a second hyperplane in the N-dimensional parameter space based on the first test results and the second test results. That is, the second hyperplane is a newly derived hyperplane based on the first plurality of sampling points (selected from the previous iteration) and the second plurality of sampling points (selected from the current iteration). For instance, the first plurality of sampling points and the second plurality of sampling points may together form a set of sampling points in the N-dimensional parameter space and the second hyperplane may separate the set of sampling points into a first group (or class) corresponding to vehicle test scenarios in which the vehicle compute process fails and a second group (or class) corresponding to test scenarios in which the vehicle compute process passes.

By keeping or utilizing test results (e.g., the first test results) from an earlier or previous iteration to determine an updated hyperplane for a later or current iteration effectively reduces the weight of test results (e.g., the second test results) from the later or current iteration. This updating technique allows for convergence to a best-fit or optimal hyperplane (pass/fail boundary) with multiple iterations. For instance, the computer-implemented system may perform the vehicle test scenario generation and hyperplane computations iteratively (or repeatedly) until a test termination condition (or threshold) is satisfied. In some aspects, the test termination condition may be based on a difference between a hyperplane computed from a current iteration and a hyperplane computed from a previous iteration being sufficiently small (e.g., satisfying a threshold). After terminating the test, the computer-implemented system may determine a capability (e.g., a quantifiable metric) based on the most recent computed hyperplane.

In some aspects, the computer-implemented system may randomly and/or sparsely sample the N-dimensional parameter space by selecting the first plurality of sampling points in the N-dimensional parameter space, for example, for an initial iteration at the beginning of the vehicle capability test. Subsequently, the computer-implemented system may generate the first plurality of vehicle test scenarios based on the first plurality of sampling points. To reduce the number of test scenarios for testing, the computer-implemented system may determine a search direction for the next iteration based on the first hyperplane. To that end, the computer-implemented system may select the second plurality of sampling points for the next iteration from a subspace of the N-dimensional parameter space, where the subspace may be on one side of the first hyperplane (e.g., on the side in which the sampling points corresponding to vehicle test scenarios in which the vehicle compute process passes are located). In some aspects, the computer-implemented system may sample densely along the first hyperplane (e.g., by randomly selecting the second plurality of sampling points on the first hyperplane). Subsequently, the computer-implemented system may generate the second plurality of vehicle test scenarios based on the second plurality of sampling points.

The systems, schemes, and mechanisms described herein can advantageously define vehicle capabilities with quantifiable metrics and determine the vehicle capabilities via hyperplane searches. Further, utilizing a current hyperplane to determine a search direction for a next iteration can allow for an efficient search (e.g., with a reduced number of test scenarios to be tested), and thus can reduce time and cost (e.g., in terms of compute resources). The reduced time and cost for AV capability testing can be significant. For example, to deploy an AV compute process in an AV, the AV compute process may iterate through multiple development, integration, and release cycles in which test cases are to be re-tested at each stage of a cycle. While the disclosed embodiments describe hyperplane search mechanisms being applied for testing AV capabilities, similar hyperplane search mechanisms may be applied for any other suitable AV tests.

Figure 8:
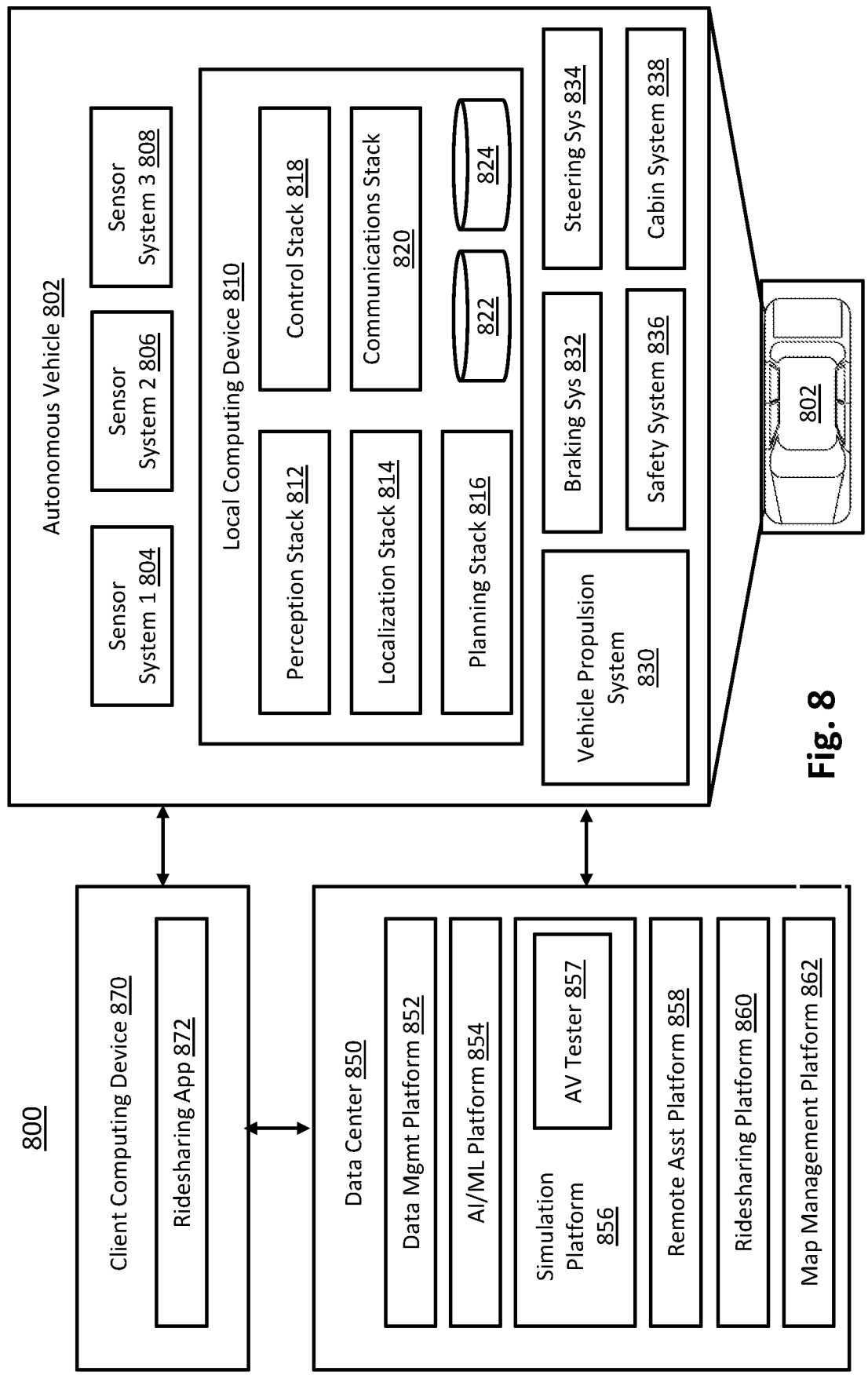
FIG. 8 illustrates an example system environment for operating AVs and performing hyperplane search-based AV capability testing, according to some aspects of the disclosed technology.

FIG. 1 illustrates a simulation environment 100 for autonomous driving in which hyperplane searches may be implemented for AV capability testing, according to some examples of the present disclosure. The simulation environment 100 may include a simulation platform 110 simulating a traffic scenario 104. The simulation platform 110 may be any suitable computer-implemented system. In some examples, the simulation platform 110 may be similar to the simulation platform 856 of FIG. 8. In some examples, the simulation platform 110 may be similar to the processor-based system 900 of FIG. 9. In some examples, the simulation platform 110 may utilize cloud services for compute resources, storage resources, network resources, etc. In some examples, the simulation platform 110 may be part of a data center 850 as shown in FIG. 8. In general, the simulation platform 110 may be used for AV code development, code testing, and/or code integration.

In an aspect, an AV compute process (or software stack) 112 may be executed on the simulation platform 110. The AV compute process 112 may include a perception stack, a prediction stack, a planning stack, a control stack, etc. as will be discussed more fully below with reference to FIG. 8. Further, an AV tester 114 (e.g., including testing software, tools, testing simulator, etc.) may be executed on the simulation platform 110. The AV tester 114 may generate test cases 122 for various traffic scenarios (e.g., a scenario 104) and test the AV compute process 112 using the test cases 122. To that end, the AV tester 114 may execute the AV compute process 112 in the test traffic scenarios and measure the performance of the AV compute process 112 (or the AV 102), for example, in terms of perception, prediction, planning, control, etc., or an overall driving performance. After the AV compute process 112 successfully passes the test cases 122 or traffic scenarios, the AV compute process 112 can be deployed in an AV 102, which may be a semi-autonomous vehicle or semi-autonomous vehicle. In some examples, the AV 102 may be similar to the AV 802 of FIG. 8.

According to aspects of the present disclosure, the AV tester 114 may include an AV capability tester 120. The AV capability tester 120 may utilize hyperplane searches as discussed herein to measure the capabilities of the AV 102. For instance, the AV capability tester 120 may sample a finite N-dimensional parameter space representative of traffic scenarios, where N may be any positive integers (e.g., 1, 2, 3, 4, or more). Each dimension of the N-dimensional parameter space may correspond to a test parameter (e.g., related to the position of a vehicle, a lane boundary, a road curvature, etc.) associated with the vehicle capability test. Each sampling point in the N-dimensional parameter space may define a test scenario. The AV capability tester 120 may generate a plurality of vehicle test scenarios, each corresponding to a different one of a plurality of sampling points in the N-dimensional parameter space. The AV capability tester 120 may execute the AV compute process 112 in each test scenario of the plurality of vehicle test scenarios to generate a test result for each respective test scenario. The AV capability tester 120 may compute a hyperplane in the N-dimensional parameter space to classify or separate the plurality of sampling points into a first group (or class) and a second group (or class) and determine a capability of the AV 102 based on the hyperplane. For instance, the first group or class may correspond to vehicle test scenarios in which the AV compute process 112 fails. The second group may correspond to test scenarios in which the AV compute process 112 passes.

For simplicity of illustration and discussion, FIG. 1 illustrates a two-dimensional parameter space 130 (e.g., N=2), where one axis (or dimension) may represent a parameter A and another axis (or dimension) may represent a parameter B. The parameters A and B may be associated with a particular capability of the AV 102. To generate the test cases 122 of AV capability testing, the AV capability tester 120 may sample the parameter space 130 by selecting a plurality sampling points 132 (shown as 132a, 132b, 132c, and 132d) in the parameter space 130, and configure the parameter A and the parameter B with values corresponding to the sampling points 132. As an example, the AV capability tester 120 may generate a first test case 122 according to the sampling point 132a by configuring the parameter A with a value A1 and the parameter B with a value B 1. In a similar way, the AV capability tester 120 may generate a second test case 122 according to the sampling point 132b by configuring the parameter A with a value A2 and the parameter B with a value B2, and so on. While FIG. 1 illustrates four sampling points 132, the AV capability tester 120 may select any suitable number of sampling points 132 (e.g., 3, 6, 7, 8 or more). In general, the selection can be sparse and/or random (especially for an initial iteration of the test).

After generating the test cases 122, the AV capability tester 120 may execute the AV compute process 112 for each of the test cases 122 to generate a respective test result. The test result may generally be a pass or a failure. In the illustrated example of FIG. 1, the AV compute process 112 fails the test cases 122 corresponding to the sampling points 132a and 132b (shown by the square symbols) but passes the test cases corresponding to the sampling points 132c and 132d (shown by the circle symbols). To determine which direction to search in the parameter space 130 for a next iteration, the AV capability tester 120 may compute a hyperplane 140 in the parameter space 130 to separate the sampling points 132 based on associated pass/fail test results. As shown, the hyperplane 140 separates the sampling points 132 into a group of sampling points 132 corresponding to test cases 122 for which the AV compute process 112 passes and another group of sampling points 132 corresponding to test cases 122 for which the AV compute process 112 fails. In some aspects, the AV capability tester 120 may utilize a stochastic gradient descent (SGD) classifier or a support vector machine (SVM) to compute the hyperplane 140.

As will be discussed more fully below with reference to FIGS. 4 and 5A-5B, the AV capability tester 120 may repeat the sampling point selection (e.g., selecting sampling points along the hyperplane 140 or on one side of the hyperplane 140 to narrow the search), the test case generation, the AV compute process execution, and the hyperplane computation until a best-fit hyperplane representative of the capability of the AV 102 is found. As part of the hyperplane computation, the AV capability tester 120 may update a hyperplane based on test results from previous iteration(s) and a current iteration.

Figure 2:
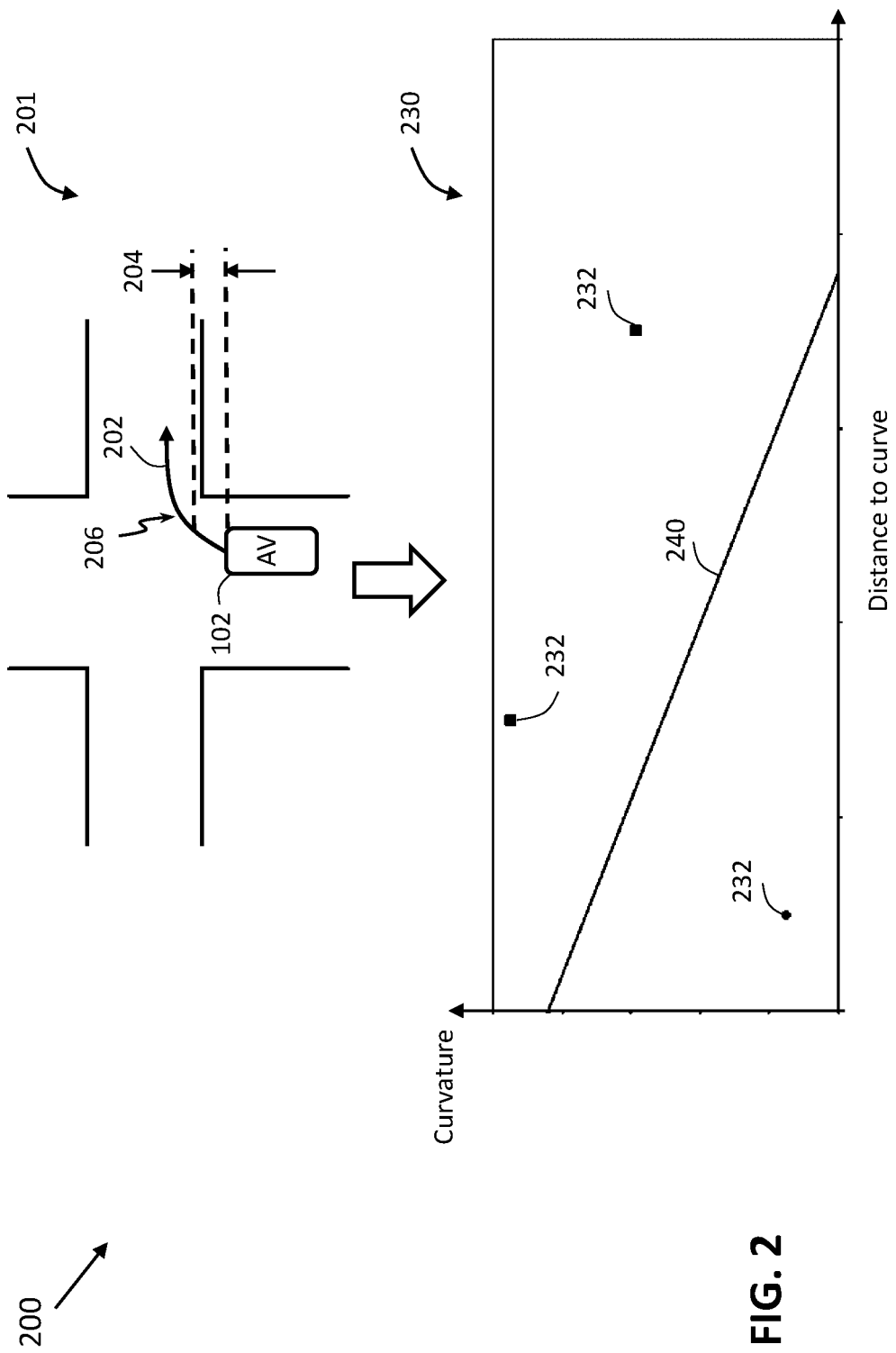
FIG. 2 illustrates an AV capability test scheme that utilizes hyperplane searches, according to some examples of the present disclosure.
Figure 3:
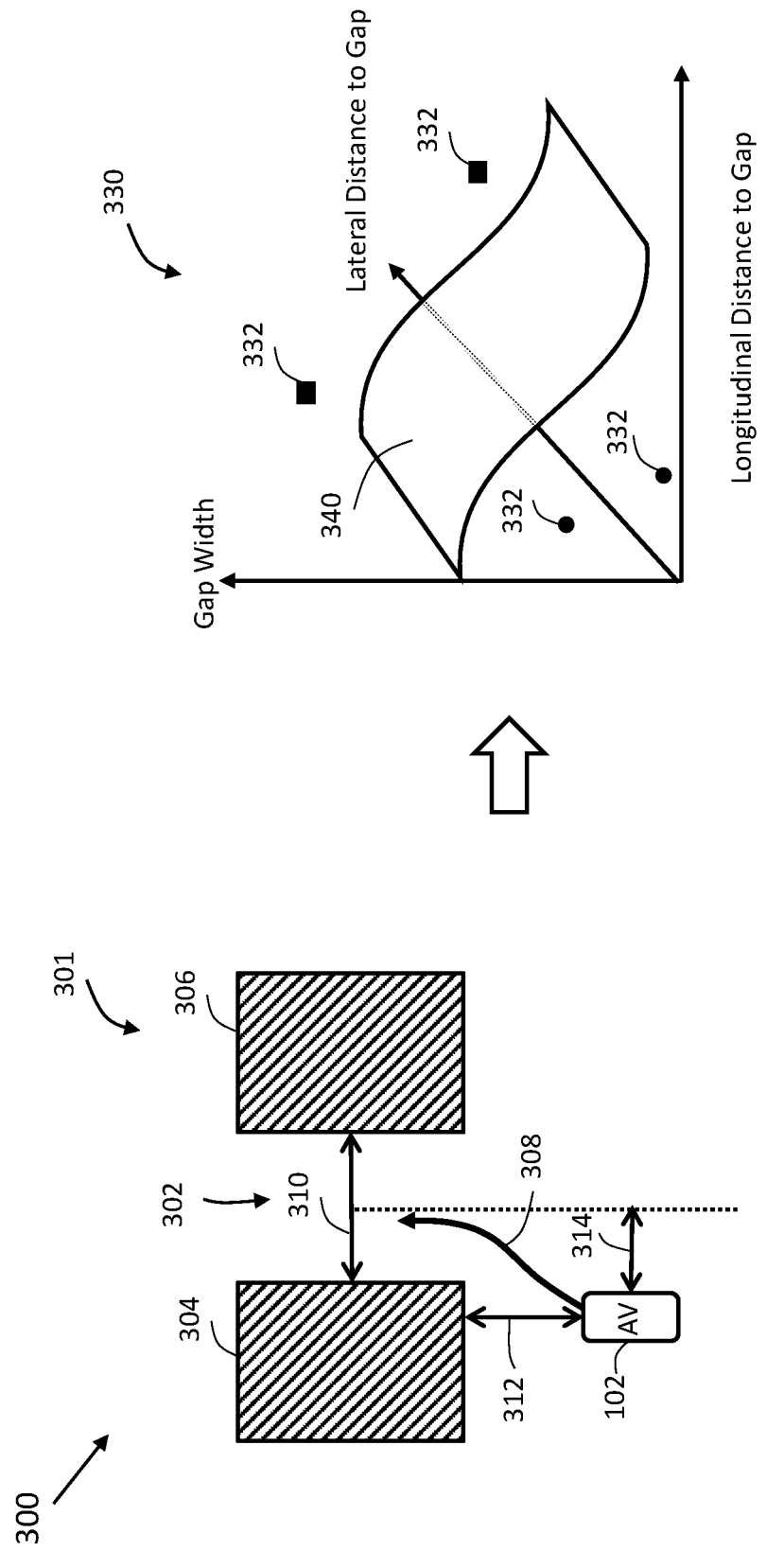
FIG. 3 illustrates an AV capability test scheme that utilizes hyperplane searches, according to some examples of the present disclosure.

FIGS. 2 and 3 are discussed in relation to FIG. 1 to illustrate various exemplary AV capability tests using hyperplane searches. FIG. 2 illustrates an AV capability test scheme 200 that utilizes hyperplane searches, according to some examples of the present disclosure. The scheme 200 may be implemented by the AV capability tester 120 of FIG. 1, the AV tester 857 of FIG. 8, and/or the processor-based system 900 of FIG. 9. The scheme 200 may generate test scenarios or test cases (e.g., the test cases 122) to determine a maximum curvature that the AV 102 may be capable of maneuvering. Stated differently, the scheme 200 may be used to determine how tight the AV 102 may make a turn (e.g., a right turn).

For instance, in a traffic scenario 201, the AV 102 may be near an intersection, and a trajectory or path 202 including a certain curvature 206 may be planned for the AV 102 (e.g., by an AV compute process or planning stack executing on the AV 102). Accordingly, it may be useful for a planning stack of the AV 102 to have information about the maximum curvature that the AV 102 can navigate. To test such a capability of the AV 102, the AV capability tester 120 may determine a two-dimensional parameter space 230, where one dimension (e.g., y-axis) may represent a curvature (e.g., the curvature 206) of a path and another dimension (e.g., x-axis) may represent a distance (e.g., a distance 204) from the AV 102's current position to the curvature 206. The AV capability tester 120 may generate test scenarios (e.g., the test cases 122) by sampling the parameter space 230. As shown, the AV capability tester 120 may select sampling points 232 and generate test cases based on the sampling points 232. The AV capability tester 120 may execute the AV compute process 112 in each test scenario to determine whether the AV compute process 112 passes or fails in each test scenario. Subsequently, the AV capability tester 120 may compute a hyperplane 240 (e.g., a line) to classify the sampling points 232 into a first class of sampling points 232 corresponding to test scenarios in which the AV compute process 112 fails (shown by the square symbols) and a second class of sampling points 232 corresponding to test scenarios in which the AV compute process 112 passes (shown by the circle symbols).

As will be discussed more fully below with reference to FIGS. 4 and 5A-5B, the AV capability tester 120 may repeat the sampling point selection (e.g., selecting sampling points on one side of the hyperplane 240 to narrow the search), the test case generation, the AV compute process execution, and the hyperplane computation until a computed hyperplane is representative of how tight the AV 102 is capable of maneuvering.

FIG. 3 illustrates an AV capability test scheme 300 that utilizes hyperplane searches, according to some examples of the present disclosure. The scheme 300 may be implemented by the AV capability tester 120 of FIG. 1, the AV tester 857 of FIG. 8, and/or the processor-based system 900 of FIG. 9. The scheme 300 may generate test scenarios or test cases (e.g., the test cases 122) to determine a minimum gap width that the AV 102 may be capable of driving through.

For instance, in a traffic scenario 301, the AV 102 may be near a gap 302 between two objects 304 and 306 (which may be buildings, parked vehicles, etc.) and a trajectory or path 308 planned for the AV 102 may include driving through the gap 302. Accordingly, it may be useful for a planning stack of the AV 102 to have information about the minimum gap width that the AV 102 can drive through. To test such a capability of the AV 102, the AV capability tester 120 may determine a three-dimensional parameter space 330, where a first dimension (e.g., y-axis) may represent a gap width (e.g., the width 310), a second dimension (e.g., x-axis) may represent a longitudinal distance (e.g., the distance 312) from the AV 102's current position to the gap 302, and a third dimension (e.g., z-axis) may represent a lateral distance (e.g., the distance 314) of the AV 102's current position to the gap 302. The AV capability tester 120 may generate test scenarios (e.g., the test cases 122) by sampling the parameter space 330. As shown, the AV capability tester 120 may select sampling points 332 and generate test scenarios based on the sampling points 332. The AV capability tester 120 may execute the AV compute process 112 in each test scenario to determine whether the AV compute process 112 passes or fails in each test scenario. The AV capability tester 120 may compute a hyperplane 340 to classify the sampling points 332 into a first class of sampling points 332 corresponding to test scenarios in which the AV compute process 112 fails (shown by the square symbols) and a second class of sampling points 332 corresponding to test scenarios in which the AV compute process 112 passes (shown by the circle symbols). The hyperplane 340 may be any two-dimensional plane of any shape within the three-dimensional parameter space 330.

As will be discussed more fully below with reference to FIGS. 4 and 5A-5B, the AV capability tester 120 may repeat the sampling point selection (e.g., selecting sampling points on one side of the hyperplane 340 to narrow the search), the test case generation, the AV compute process execution, and the hyperplane computation until a computed hyperplane is representative of how narrow a gap the AV 102 is capable of maneuvering through.

Figure 4:
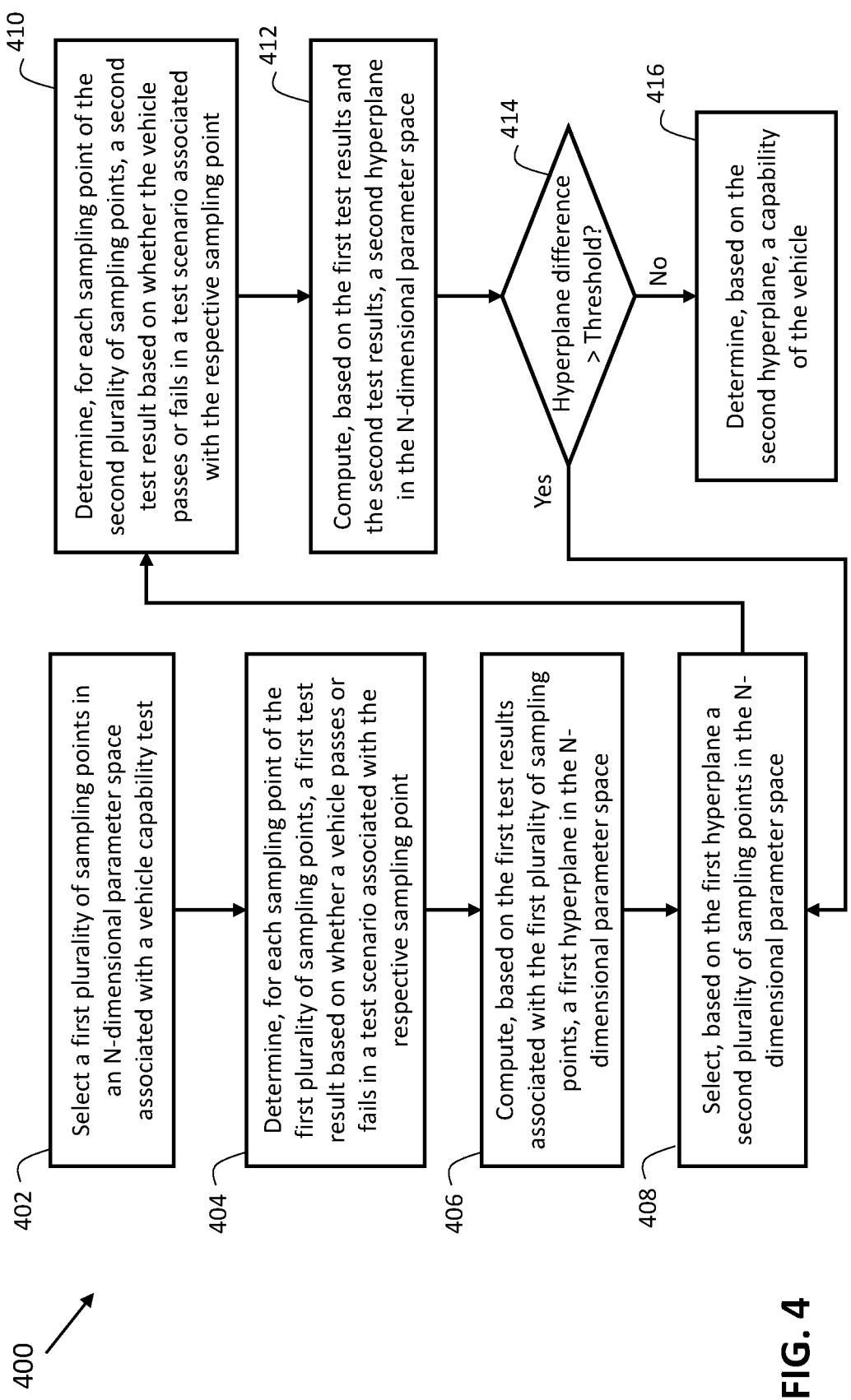
FIG. 4 illustrates an AV capability test process that utilizes hyperplane searches, according to some examples of the present disclosure.

FIG. 4 illustrates an AV capability test process 400 that utilizes hyperplane searches, according to some examples of the present disclosure. The process 400 can be implemented by a computer-implemented system such as the simulation platform 110 of FIG. 1, the simulation platform 856 of FIG. 8, and/or the processor-based system 900 of FIG. 9. In certain aspects, the process 400 can be implemented by the AV capability tester 120 of FIG. 1, the AV tester 857 of FIG. 8, and/or the AV capability testing service 932 of FIG. 9. The process 400 may be performed using any suitable hardware components and/or software components. The process 400 may utilize similar mechanisms discussed above with reference to FIGS. 1-3. Operations are illustrated once each and in a particular order in FIG. 4, but the operations may be performed in parallel, reordered, and/or repeated as desired.

At 402, a first plurality of sampling points in an N-dimensional parameter space associated with a vehicle capability test may be selected (e.g., for an initial test iteration). N may be a positive integer (e.g., 1, 2, 3, 4, 5, 6 or more). In a first example, the N-dimensional parameter space may correspond to the parameter space 130 and the first plurality of sampling points may correspond to the sampling points 132 as shown in FIG. 1. In a second example, the N-dimensional parameter space may correspond to the parameter space 230 and the first plurality of sampling points may correspond to the sampling points 232 as shown in FIG. 2. In a third example, the N-dimensional parameter space may correspond to the parameter space 330 and the first plurality of sampling points may correspond to the sampling points 332 as shown in FIG. 3. A further example is shown in FIG. 5A and discussed more fully below. In some aspects, the selection may be based on a random selection. The first plurality of sampling points may be randomly spaced or non-uniformly spaced and can be sparse. In some aspects, the number of first plurality of sampling points may be limited to be below a certain threshold, for example, to maintain a low number of test cases.

At 404, for each sampling point of the first plurality of sampling points, a first test result is determined based on whether a vehicle (e.g., the AV 102 and/or the AV 402, or more specifically, an AV compute process such as the AV compute process 112 that operates the vehicle) passes or fails in a test scenario associated with the respective sampling point. To that end, a test scenario may be generated for each sampling point, for example, by configuring test parameters with values corresponding to coordinate values of the respective sampling point, and the AV compute process may be executed in each respective scenario.

At 406, a first hyperplane (e.g., the hyperplanes 140, 240, and/or 340) in the N-dimensional parameter space may be computed based on the first test results associated with the first plurality of sampling points. For instance, each of the first plurality of sampling points may be labeled or associated with a pass or fail based on whether the vehicle passes or fails a test scenario configured based on the respective sampling point. The first hyperplane may be computed such that the first hyperplane may partition the N-dimensional parameter space into two subspaces, where all sampled points associated with passed results may be within one subspace and all other sampled points associated with failed results may be within the other subspace. That is, the first hyperplane may operate as a pass/fail boundary in the N-dimensional parameter space. In some aspects, the first hyperplane may be computed using an SGD classifier. In some aspects, the first hyperplane may be computed using an SVM.

At 408, a second plurality of sampling points in the N-dimensional parameter space may be selected based on the first hyperplane (e.g., for a next test iteration). In some aspects, as part of the selecting, the second plurality of sampling points may be selected from a subspace of the N-dimensional parameter space that is on one side of the first hyperplane, for example, from the side where the subset of the first plurality of sampling points associated with the passed results are located. In some aspects, the N-dimensional parameter space may be sampled densely along the first hyperplane (e.g., on the first hyperplane) as shown in FIG. 5B as will be discussed more fully below. That is, each of the second plurality of sampling points may have a shorter distance to the first hyperplane than the first plurality of sampling points.

At 410, for each sampling point of the second plurality of sampling points, a second test result is determined based on whether the vehicle passes or fails in a test scenario associated with the respective sampling point. For instance, a test scenario may be generated for each sampling point of the second plurality of sampling points and a corresponding second test result may be determined, for example, using mechanisms as discussed at 404.

At 412, a second hyperplane in the N-dimensional parameter space may be computed based on the first test results associated with the first plurality of sampling points and the second test results associated with the second plurality of sampling points, for example, using similar mechanisms as discussed at 406. That is, the second hyperplane is a newly derived hyperplane based on the first plurality of sampling points (selected from the previous iteration) and the second plurality of sampling points (selected from the current iteration). For instance, the first plurality of sampling points and the second plurality of sampling points may together form a set of sampling points in the N-dimensional parameter space and the second hyperplane may separate the set of sampling points into a first group (or class) corresponding to vehicle test scenarios in which the vehicle compute process fails and a second group (or class) corresponding to test scenarios in which the vehicle compute process passes. Utilizing both the first test results from a previous iteration and the second test results from the current iteration to update the hyperplane (e.g., from the first hyperplane to the second hyperplane) may effectively reduce the weight of the second test results from the current iteration for the update. That is, the hyperplane update is based on a weighted combination of test results from a previous iteration and a current iteration.

At 414, a determination of whether a hyperplane difference between the second hyperplane (from the current iteration) and the first hyperplane (from the previous iteration) is greater than a threshold may be made, for example, to determine whether the vehicle capability test has converged and can be terminated. In some aspects, a hyperplane may be represented by parameter(s), and the difference between the second hyperplane and the first hyperplane may be based on respective parameter(s) of the second hyperplane and the first hyperplane.

If the difference between the second hyperplane (from the current iteration) and the first hyperplane (from the previous iteration) is greater than the threshold, the process may return to 408 and repeat the operations at 408, 410, 412, and 414. If, however, the difference between the second hyperplane (from the current iteration) and the first hyperplane (from the previous iteration) is not greater than the threshold, the process 400 may proceed to 416. At 416, a capability of the vehicle may be determined based on the second hyperplane. Stated differently, the terminating condition for the vehicle capability test is a hyperplane close to (or corresponds to) a best-fit hyperplane being found, and thus hyperplanes computed for consecutive iterations may not vary significantly.

The vehicle capability computed at 416 may be a quantifiable metric as explained above. More specifically, the vehicle capability may be an associated set of parameters corresponding to coordinate values of a sampling point on the second hyperplane. Referring to the example of AV capability in making a tight turn discussed above with reference to FIG. 2, the AV capability may be represented by a parameter pair including a path curvature and an associated distance from the AV location to the curvature. Referring to the example of AV capability in driving through a narrow gap discussed above with reference to FIG. 3, the AV capability may be represented by a parameter triplet including a gap width and an associated lateral distance and an associated longitudinal distance from the AV location to the curvature.

FIGS. 5A-5B are discussed in relation to FIG. 4 to further illustrate hyperplane search-based the AV capability testing process 400 of FIG. 4. FIG. 5A illustrates a hyperplane search-based AV capability test 500 during a first iteration (e.g., an initial iteration), according to some examples of the present disclosure. FIG. 5B illustrates the hyperplane search-based AV capability test 500 during a second iteration subsequent to the first iteration, according to some examples of the present disclosure. In an example, the AV capability test 500 may correspond to the vehicle capability test discussed in FIG. 4. For simplicity of illustration and discussion, FIGS. 5A and 5B illustrate the AV capability test 500 using a two-dimensional parameter space 530 with a parameter A and a parameter B. However, in general, the AV capability test process 400 can include any suitable number of dimensions (e.g., 3, 4, 5, 6 or more).

In FIG. 5A, the parameter space 530 may correspond to the N-dimensional parameter space discussed above with reference to FIG. 4. The sampling points 532 may correspond to the first plurality of sampling points selected at 402. The sampling points 532 may be selected as part of an initial iteration of the test 500. The sampling points 532 shown by the square symbols may correspond to test scenarios in which the vehicle fails (e.g., the first test results with failures) at 404. The sampling points 532 shown by the circle symbols may correspond to test scenarios in which the vehicle passes (e.g., the first test results with passes) at 404. The hyperplane 540 that separates the sampling points 532 into a first group 534a and a second group 534b may correspond to the first hyperplane computed at 406.

In FIG. 5B, the sampling points 552 may correspond to the second plurality of sampling points selected based on the first hyperplane computed at 408. The sampling points 552 may be selected as part of an iteration subsequent to the initial iteration. The hyperplane 540 from the previous iteration is shown as a dotted line in FIG. 5B as a reference. As can be seen, the sampling points 552 are selected along the hyperplane 540 and/or from one side of the hyperplane 540 (e.g., from the side where the group 534b of sampling points 532 associated with passes are located). Each of the sampling points 552 (for the current iteration) may have a shorter distance to the hyperplane 540 (from the previous iteration) than the sampling point 532 (from the previous iteration shown in FIG. 5A). As used herein, a distance from a sampling point 532 to the first hyperplane 540 may refer to the shortest distance from the respective sampling point 532 along a line perpendicular (or tangential) to the first hyperplane 540. The sampling points 552 shown by the square symbols may correspond to test scenarios in which the vehicle fails (e.g., the first test results with failures) at 410. The sampling points 552 shown by the circle symbols may correspond to test scenarios in which the vehicle passes (e.g., the first test results with passes) at 410. The sampling points 532 (from the previous iteration) and the sampling points 552 (newly selected for the current iteration) may together form a set of sampling points as shown in FIG. 5B for determining an updated hyperplane for the current iteration. For instance, a hyperplane 560 (the updated hyperplane) can be computed to separate the sampling points 532 and 552 into a first group (e.g., upper right portion of the parameter space 530) corresponding to test scenarios in which the vehicle fails and a second group (e.g., lower left portion of the parameter space 530) corresponding to test scenarios in which the vehicle passes, where the hyperplane 560 may correspond to the second hyperplane computed at 412.

Comparing FIGS. 5A-5B, the hyperplane 560 in FIG. 5B is shifted towards the origin compared to the hyperplane 540 from the previous iteration shown in FIG. 5A. The AV capability test 500 can iterate through one or more iterations until the hyperplane from one iteration is about the same as the hyperplane from a previous iteration. That is, the AV capability test 500 can be iterated until it converges to a solution indicative of the capability of the AV. In some aspects, a hyperplane (e.g., the hyperplanes 140, 240, 340, 540, and 560) may be expressed in terms of a weight parameter (e.g., the w1 vector shown in FIG. 5A and the w2 vector shown in FIG. 5B), and the AV capability test 500 may be terminated based on a difference between a weight parameter of a hyperplane from a current iteration and a weight parameter of a hyperplane from a previous iteration satisfies a threshold. In general, a hyperplane can be described by an equation (a hyperplane equation) including parameters with a w vector (e.g., w1 or w2) tangential to the hyperplane being one of the parameters.

Figure 6:
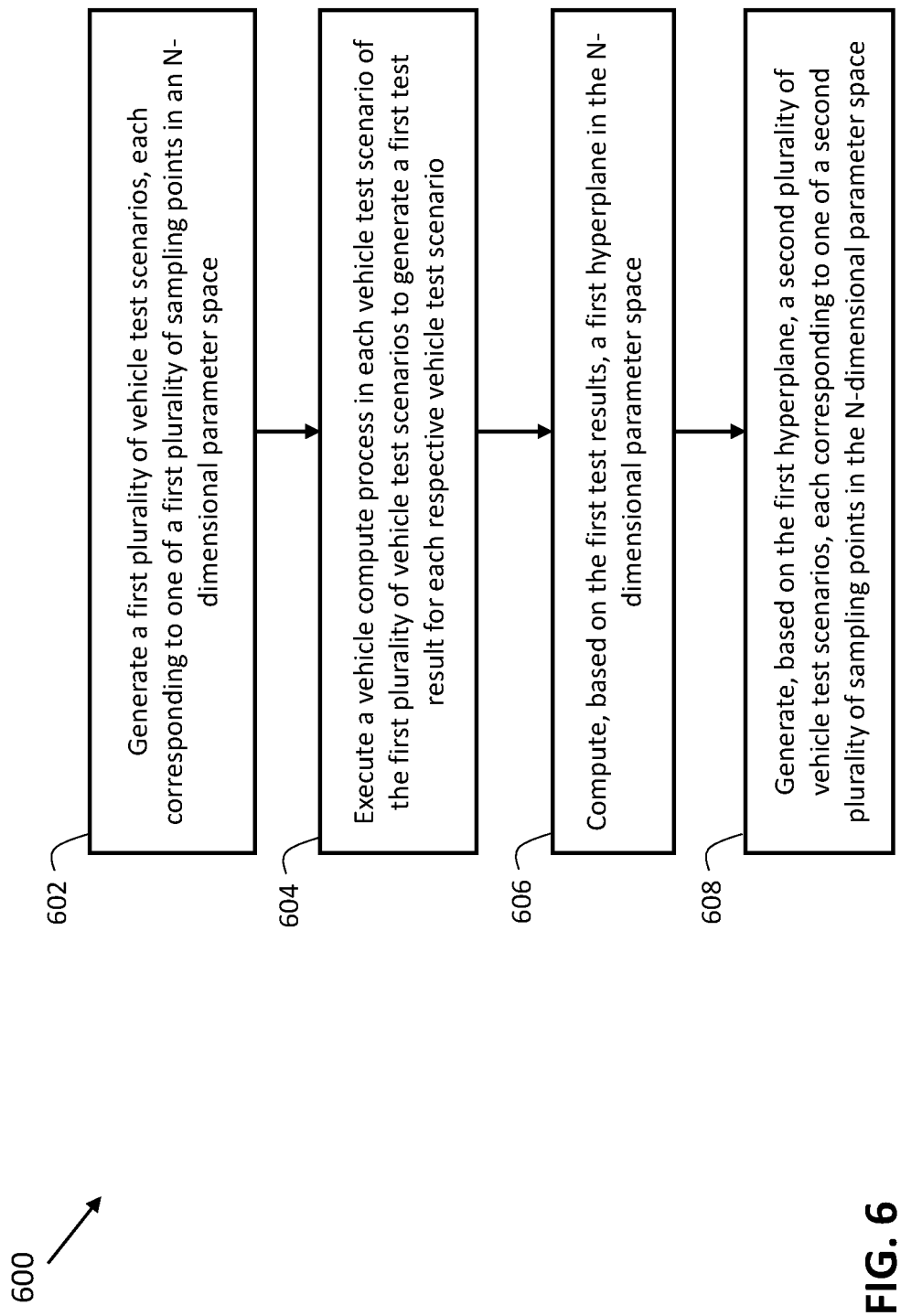
FIG. 6 illustrates an AV simulation test process that utilizes hyperplane searches, according to some examples of the present disclosure.

FIG. 6 illustrates an AV capability test process 600 that utilizes hyperplane searches, according to some examples of the present disclosure. The process 600 can be implemented by a computer-implemented system such as the simulation platform 110 of FIG. 1, the simulation platform 856 of FIG. 8, and/or the processor-based system 900 of FIG. 9. In certain aspects, the process 400 can be implemented by the AV capability tester 120 of FIG. 1 and/or the AV capability testing service 932 of FIG. 9. The process 600 may be performed using any suitable hardware components and/or software components. The process 600 may utilize similar mechanisms discussed above with reference to FIGS. 1-4 and 5A-5B. Operations are illustrated once each and in a particular order in FIG. 6, but the operations may be performed in parallel, reordered, and/or repeated as desired.

At 602, a first plurality of vehicle test scenarios may be generated. Each of the first plurality of vehicle test scenarios may correspond to one of a first plurality of sampling points (e.g., the sampling points 132, 232, 332, 532) in an N-multi-dimensional parameter space (e.g., the parameter space 130, 230, 330, 530), where N can be any positive integers. The N-dimensional space may have dimensions associated with at least one of a vehicle position or a lane boundary.

At 604, a vehicle compute process (e.g., the AV compute process 112) may be executed in each vehicle test scenario of the first plurality of vehicle test scenarios to generate a first test result for each respective vehicle test scenario.

At 606, a first hyperplane (e.g., the hyperplane 140, 240, 340, 540) within the multi-dimensional parameter space may be computed based on the first test results, for example, using an SGD classifier or an SVM. In some aspects, the first hyperplane may separate the first plurality of sampling points into a first group of sampling points corresponding to vehicle test scenarios in which the vehicle compute process failed and a second group of sampling points corresponding to vehicle test scenarios in which the vehicle compute process passed.

At 608, a second plurality of vehicle test scenarios may be generated based on the first hyperplane. Each of the second plurality of vehicle test scenarios may correspond to one of a second plurality of sampling points (e.g., the sampling points 552) in the N-dimensional parameter space. In some aspects, as part of generating the second plurality of vehicle test scenarios, the second plurality of sampling points in the multi-dimensional parameter space may be selected based on the first hyperplane, for example, as shown in FIG. 5B. As an example, the second plurality of sampling points may be along (or close to) the first hyperplane computed at 606, where each of the plurality of sampling points may have a shorter distance to the first hyperplane than each of the first plurality of sampling points. Further, in some instances, a greater number of sampling points may be selected for the second plurality of sampling points than for the first plurality of sampling points.

In some aspects, the process 600 may further include executing the vehicle compute process in each vehicle test scenario of the second plurality of vehicle test scenarios to generate a second test result for each respective vehicle test scenario. The process 600 may further include computing, based on the first test results and the second test results, a second hyperplane (e.g., the hyperplane 560) in the multi-dimensional parameter space. The process 600 may further include determining, based on the second hyperplane, a vehicle capability associated with the vehicle compute process.

Figure 7:
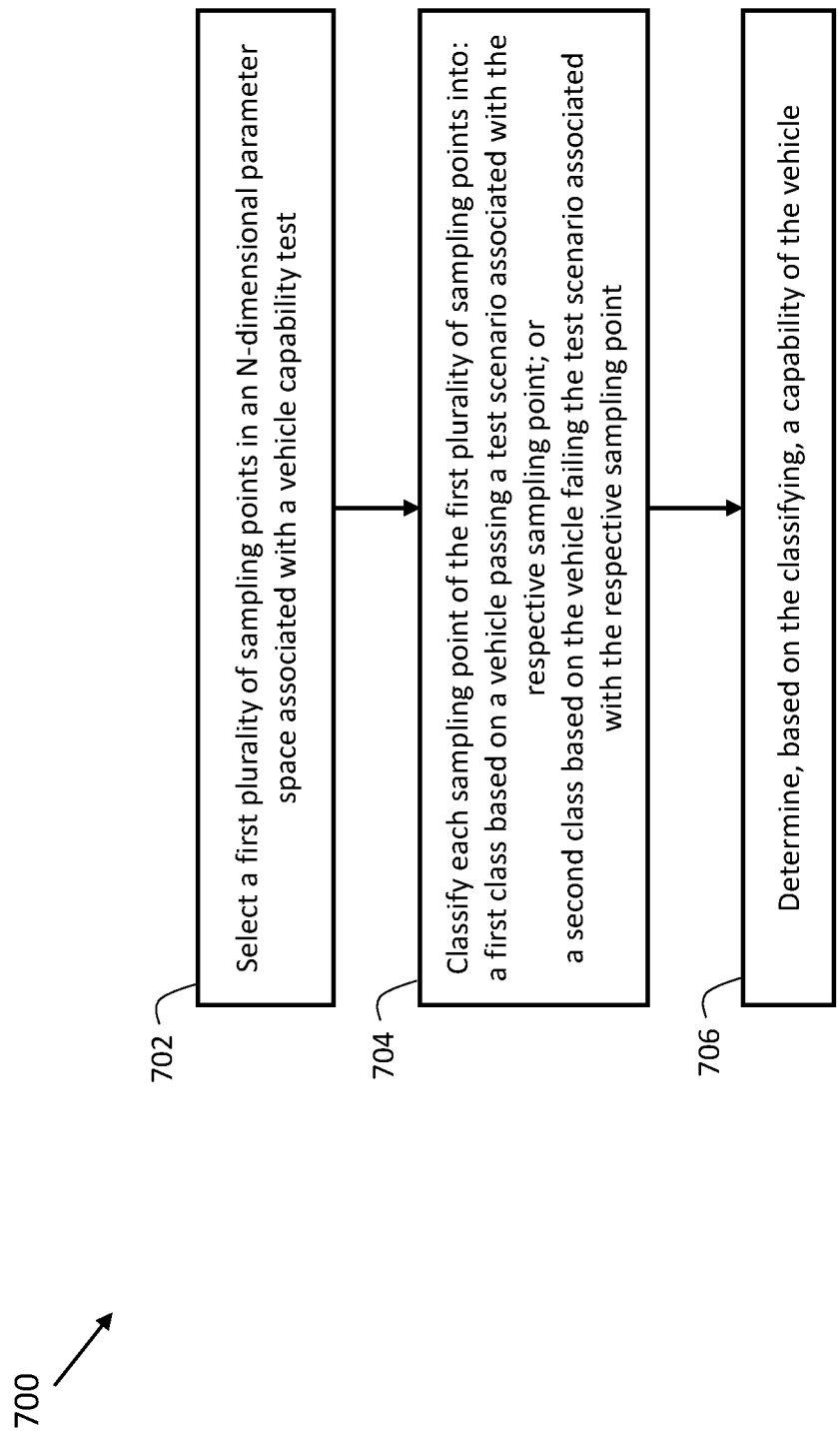
FIG. 7 illustrates an AV simulation test process that utilizes hyperplane searches, according to some examples of the present disclosure.

FIG. 7 illustrates an AV capability test process 700 that utilizes hyperplane searches, according to some examples of the present disclosure. The process 700 can be implemented by a computer-implemented system such as the simulation platform 110 of FIG. 1, the simulation platform 856 of FIG. 8, and/or the processor-based system 900 of FIG. 9. In certain aspects, the process 700 can be implemented by the AV capability tester 120 of FIG. 1 and/or the AV capability testing service 932 of FIG. 9. The process 700 may be performed using any suitable hardware components and/or software components. The process 700 may utilize similar mechanisms discussed above with reference to FIGS. 1-4, 5A-5B, and 6. Operations are illustrated once each and in a particular order in FIG. 7, but the operations may be performed in parallel, reordered, and/or repeated as desired.

At 702, a first plurality of sampling points (e.g., the sampling points 132, 232, 332, 532) in an N-dimensional parameter space (e.g., the parameter space 130, 230, 330, 530) associated with a vehicle capability test (e.g., the test 500 of FIGS. 5A-5B) may be selected. In some examples, N may be an integer greater than 1. In some aspects, the selecting the first plurality of sampling points may be based on a random selection in the N-dimensional parameter space. In some aspects, the selecting the first plurality of sampling points may be based on a threshold number of test scenarios, for example, to limit the number of test scenarios for the vehicle capability test. In some aspects, the N-dimensional parameter space may include dimensions associated with at least one of a vehicle position or a lane boundary.

At 704, each sampling point of the first plurality of sampling points may be classified into a first class based on a vehicle passing a test scenario associated with the respective sampling point or a second class based on the vehicle failing the test scenario associated with the respective sampling point. In some aspects, the classifying each sampling point of the first plurality of sampling points into the first class or the second class may be performed using an SGD classifier or an SVM. In some aspects, the classifying each sampling point of the first plurality of sampling points may include computing a first hyperplane (e.g., the hyperplane 140, 240, 340, 540, 560) in the N-dimensional parameter space. The first hyperplane may separate the first plurality of sampling points into the first class and the second class.

At 706, a capability of the vehicle may be determined based on the classifying at 704. In some aspects, the N-dimensional parameter space may be associated with at least one of a path curvature or a distance from the vehicle to the path curvature, the capability of the vehicle may be associated with a navigable path curvature, for example, as discussed above with reference to FIG. 2. In other aspects, the N-dimensional parameter space may be associated with at least one of a width of a gap, a lateral distance from the vehicle to the gap, or a longitudinal distance from the vehicle to the gap, and the capability of the vehicle may be associated with a navigable gap size, for example, as discussed above with reference to FIG. 3.

In some aspects, the process 700 may further include configuring one or more test parameters for a first test scenario based on a first sampling point of the first plurality of sampling points. In some aspects, the selecting the first plurality of sampling points at 702 may be based on a second hyperplane in the N-dimensional parameter space, where the second hyperplane is different from the first hyperplane. For example, the second hyperplane may be computed from a previous iteration, where the second hyperplane separates a second plurality of sampling points in the N-dimensional parameter space into the first class and the second class. As such, the first plurality of sampling points (for the current iteration) can include the second plurality of sampling points (from the previous iteration). In some aspects, the process 700 may further include terminating the vehicle capability test based on a comparison between the first hyperplane and the second hyperplane. In some aspects, the process 700 may further include terminating the vehicle capability test based on a difference between a first weight associated with the first hyperplane and a second weight associated with the second hyperplane satisfying a threshold. In some aspects, the determining the capability of the vehicle based on the first hyperplane at 706 may be responsive to a difference between the first hyperplane and the second hyperplane satisfying a threshold.

In some aspects, the AV capability testing mechanisms discussed above with reference to FIGS. 1-4, 5A-5B, and/or 6-7 can be applied during a development stage, an integration stage, or a release stage. For example, during a development stage, a developer may develop an enhancement to an AV capability in an AV planning stack and may utilize the AV capability testing mechanisms to measure the enhancement. During an integration stage, the AV planning stack may be merged or integrated with a certain code base and tested using the AV capability testing mechanisms to determine whether the merged or integrated code operates correctly (e.g., with the expected AV capability enhancement).

During a release stage, a code release may be created from the validated code base and tested using the AV capability testing mechanisms to determine whether the merged or integrated code operates correctly (e.g., with the expected AV capability enhancement). In general, the disclosed AV capability testing mechanisms can be applied to any stage of an AV code development, integration, and release cycle. The disclosed AV capability testing mechanisms can provide quantifiable AV capability measures, and thus can be effective in determining whether an integration code or a release code performs as expected. Further, the quantifiable AV capability measures can facilitate an AV planning stack in determining a trajectory for an AV or adjusting a trajectory for an AV based on a target AV to be deployed with the AV planning stack. Further still, the hyperplane searches disclosed herein can reduce testing time, and thus can shorten the time for code, integration, and release cycles.

While examples of an AV's capability in making a tight turn or driving through a narrow gap are discussed above, the disclosed hyperplane search techniques can be applied to determine any suitable vehicle capabilities.

Turning now to FIG. 8, this figure illustrates an example of an AV management system 800. One of ordinary skill in the art will understand that, for the AV management system 800 and any system discussed in the present disclosure, there may be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 800 includes an AV 802, a data center 850, and a client computing device 870. The AV 802, the data center 850, and the client computing device 870 may communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 802 may navigate about roadways without a human driver based on sensor signals generated by multiple sensor systems 804, 806, and 808. The sensor systems 804-808 may include different types of sensors and may be arranged about the AV 802. For instance, the sensor systems 804-808 may comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 804 may be a camera system, the sensor system 806 may be a LIDAR system, and the sensor system 808 may be a RADAR system. Other embodiments may include any other number and type of sensors.

AV 802 may also include several mechanical systems that may be used to maneuver or operate AV 802. For instance, the mechanical systems may include vehicle propulsion system 830, braking system 832, steering system 834, safety system 836, and cabin system 838, among other systems. Vehicle propulsion system 830 may include an electric motor, an internal combustion engine, or both. The braking system 832 may include an engine brake, a wheel braking system (e.g., a disc braking system that utilizes brake pads), hydraulics, actuators, and/or any other suitable componentry configured to assist in decelerating AV 802. The steering system 834 may include suitable componentry configured to control the direction of movement of the AV 802 during navigation. Safety system 836 may include lights and signal indicators, a parking brake, airbags, and so forth. The cabin system 838 may include cabin temperature control systems, in-cabin entertainment systems, and so forth. In some embodiments, the AV 802 may not include human driver actuators (e.g., steering wheel, handbrake, foot brake pedal, foot accelerator pedal, turn signal lever, window wipers, etc.) for controlling the AV 802. Instead, the cabin system 838 may include one or more client interfaces (e.g., Graphical User Interfaces (GUIs), Voice User Interfaces (VUIs), etc.) for controlling certain aspects of the mechanical systems 830-838.

AV 802 may additionally include a local computing device 810 that is in communication with the sensor systems 804-808, the mechanical systems 830-838, the data center 850, and the client computing device 870, among other systems. The local computing device 810 may include one or more processors and memory, including instructions that may be executed by the one or more processors. The instructions may make up one or more software stacks or components responsible for controlling the AV 802; communicating with the data center 850, the client computing device 870, and other systems; receiving inputs from riders, passengers, and other entities within the AV's environment; logging metrics collected by the sensor systems 804-808; and so forth. In this example, the local computing device 810 includes a perception stack 812, a mapping and localization stack 814, a planning stack 816, a control stack 818, a communications stack 820, an High Definition (HD) geospatial database 822, and an AV operational database 824, among other stacks and systems.

Perception stack 812 may enable the AV 802 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 804-808, the mapping and localization stack 814, the HD geospatial database 822, other components of the AV, and other data sources (e.g., the data center 850, the client computing device 870, third-party data sources, etc.). The perception stack 812 may detect and classify objects and determine their current and predicted locations, speeds, directions, and the like. In addition, the perception stack 812 may determine the free space around the AV 802 (e.g., to maintain a safe distance from other objects, change lanes, park the AV, etc.). The perception stack 812 may also identify environmental uncertainties, such as where to look for moving objects, flag areas that may be obscured or blocked from view, and so forth.

Mapping and localization stack 814 may determine the AV's position and orientation (pose) using different methods from multiple systems (e.g., GPS, IMUs, cameras, LIDAR, RADAR, ultrasonic sensors, the HD geospatial database 822, etc.). For example, in some embodiments, the AV 802 may compare sensor data captured in real-time by the sensor systems 804-808 to data in the HD geospatial database 822 to determine its precise (e.g., accurate to the order of a few centimeters or less) position and orientation. The AV 802 may focus its search based on sensor data from one or more first sensor systems (e.g., GPS) by matching sensor data from one or more second sensor systems (e.g., LIDAR). If the mapping and localization information from one system is unavailable, the AV 802 may use mapping and localization information from a redundant system and/or from remote data sources.

The planning stack 816 may determine how to maneuver or operate the AV 802 safely and efficiently in its environment. For example, the planning stack 816 may receive the location, speed, and direction of the AV 802, geospatial data, data regarding objects sharing the road with the AV 802 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 802 from one point to another. The planning stack 816 may determine multiple sets of one or more mechanical operations that the AV 802 may perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 816 may select from multiple backup plans to carry out. For example, while preparing to change lanes to turn right at an intersection, another vehicle may aggressively cut into the destination lane, making the lane change unsafe. The planning stack 816 could have already determined an alternative plan for such an event, and upon its occurrence, help to direct the AV 802 to go around the block instead of blocking a current lane while waiting for an opening to change lanes.

The control stack 818 may manage the operation of the vehicle propulsion system 830, the braking system 832, the steering system 834, the safety system 836, and the cabin system 838. The control stack 818 may receive sensor signals from the sensor systems 804-808 as well as communicate with other stacks or components of the local computing device 810 or a remote system (e.g., the data center 850) to effectuate operation of the AV 802. For example, the control stack 818 may implement the final path or actions from the multiple paths or actions provided by the planning stack 816. Implementation may involve turning the routes and decisions from the planning stack 816 into commands for the actuators that control the AV's steering, throttle, brake, and drive unit.

The communication stack 820 may transmit and receive signals between the various stacks and other components of the AV 802 and between the AV 802, the data center 850, the client computing device 870, and other remote systems. The communication stack 820 may enable the local computing device 810 to exchange information remotely over a network, such as through an antenna array or interface that may provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 820 may also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 822 may store HD maps and related data of the streets upon which the AV 802 travels. In some embodiments, the HD maps and related data may comprise multiple layers, such as an areas layer, a lanes and boundaries layer, an intersections layer, a traffic controls layer, and so forth. The areas layer may include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer may include geospatial information of road lanes (e.g., lane or road centerline, lane boundaries, type of lane boundaries, etc.) and related attributes (e.g., direction of travel, speed limit, lane type, etc.). The lanes and boundaries layer may also include 3D attributes related to lanes (e.g., slope, elevation, curvature, etc.). The intersections layer may include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer may include geospatial information of traffic signal lights, traffic signs, and other road objects and related attributes.

The AV operational database 824 may store raw AV data generated by the sensor systems 804-808 and other components of the AV 802 and/or data received by the AV 802 from remote systems (e.g., the data center 850, the client computing device 870, etc.). In some embodiments, the raw AV data may include HD LIDAR point cloud data, image or video data, RADAR data, GPS data, and other sensor data that the data center 850 may use for creating or updating AV geospatial data as discussed further below with respect to FIG. 5 and elsewhere in the present disclosure.

The data center 850 may be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 850 may include one or more computing devices remote to the local computing device 810 for managing a fleet of AVs and AV-related services. For example, in addition to managing the AV 802, the data center 850 may also support a ridesharing service, a delivery service, a remote/roadside assistance service, street services (e.g., street mapping, street patrol, street cleaning, street metering, parking reservation, etc.), and the like.

The data center 850 may send and receive various signals to and from the AV 802 and the client computing device 870. These signals may include sensor data captured by the sensor systems 804-808, roadside assistance requests, software updates, ridesharing pick-up and drop-off instructions, and so forth. In this example, the data center 850 includes one or more of a data management platform 852, an Artificial Intelligence/Machine Learning (AI/ML) platform 854, a simulation platform 856, a remote assistance platform 858, a ridesharing platform 860, and a map management platform 862, among other systems.

Data management platform 852 may be a "big data" system capable of receiving and transmitting data at high speeds (e.g., near real-time or real-time), processing a large variety of data, and storing large volumes of data (e.g., terabytes, petabytes, or more of data). The varieties of data may include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 850 may access data stored by the data management platform 852 to provide their respective services.

The AI/ML platform 854 may provide the infrastructure for training and evaluating machine learning algorithms for operating the AV 802, the simulation platform 856, the remote assistance platform 858, the ridesharing platform 860, the map management platform 862, and other platforms and systems. Using the AI/ML platform 854, data scientists may prepare data sets from the data management platform 852; select, design, and train machine learning models; evaluate, refine, and deploy the models; maintain, monitor, and retrain the models; and so on.

The simulation platform 856 may enable testing and validation of the algorithms, machine learning models, neural networks, and other development efforts for the AV 802, the remote assistance platform 858, the ridesharing platform 860, the map management platform 862, and other platforms and systems. The simulation platform 856 may replicate a variety of driving environments and/or reproduce real-world scenarios from data captured by the AV 802, including rendering geospatial information and road infrastructure (e.g., streets, lanes, crosswalks, traffic lights, stop signs, etc.) obtained from the map management platform 862; modeling the behavior of other vehicles, bicycles, pedestrians, and other dynamic elements; simulating inclement weather conditions, different traffic scenarios; and so on. In some embodiments, the simulation platform 856 may include an AV tester 857 (e.g., similar the AV capability tester 120) that searches and defines AV capabilities using a finite parameter space with hyperplane searches as discussed herein.

The remote assistance platform 858 may generate and transmit instructions regarding the operation of the AV 802. For example, in response to an output of the AI/ML platform 854 or other system of the data center 850, the remote assistance platform 858 may prepare instructions for one or more stacks or other components of the AV 802.

The ridesharing platform 860 may interact with a customer of a ridesharing service via a ridesharing application 872 executing on the client computing device 870. The client computing device 870 may be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 872. The client computing device 870 may be a customer's mobile computing device or a computing device integrated with the AV 802 (e.g., the local computing device 810). The ridesharing platform 860 may receive requests to be picked up or dropped off from the ridesharing application 872 and dispatch the AV 802 for the trip.

Map management platform 862 may provide a set of tools for the manipulation and management of geographic and spatial (geospatial) and related attribute data. The data management platform 852 may receive LIDAR point cloud data, image data (e.g., still image, video, etc.), RADAR data, GPS data, and other sensor data (e.g., raw data) from one or more AVs 802, Unmanned Aerial Vehicles (UAVs), satellites, third-party mapping services, and other sources of geospatially referenced data. The raw data may be processed, and map management platform 862 may render base representations (e.g., tiles (2D), bounding volumes (3D), etc.) of the AV geospatial data to enable users to view, query, label, edit, and otherwise interact with the data. Map management platform 862 may manage workflows and tasks for operating on the AV geospatial data. Map management platform 862 may control access to the AV geospatial data, including granting or limiting access to the AV geospatial data based on user-based, role-based, group-based, task-based, and other attribute-based access control mechanisms. Map management platform 862 may provide version control for the AV geospatial data, such as to track specific changes that (human or machine) map editors have made to the data and to revert changes when necessary. Map management platform 862 may administer release management of the AV geospatial data, including distributing suitable iterations of the data to different users, computing devices, AVs, and other consumers of HD maps. Map management platform 862 may provide analytics regarding the AV geospatial data and related data, such as to generate insights relating to the throughput and quality of mapping tasks.

In some embodiments, the map viewing services of map management platform 862 may be modularized and deployed as part of one or more of the platforms and systems of the data center 850. For example, the AI/ML platform 854 may incorporate the map viewing services for visualizing the effectiveness of various object detection or object classification models, the simulation platform 856 may incorporate the map viewing services for recreating and visualizing certain driving scenarios, the remote assistance platform 858 may incorporate the map viewing services for replaying traffic incidents to facilitate and coordinate aid, the ridesharing platform 860 may incorporate the map viewing services into the client application 872 to enable passengers to view the AV 802 in transit en route to a pick-up or drop-off location, and so on.

Figure 9:
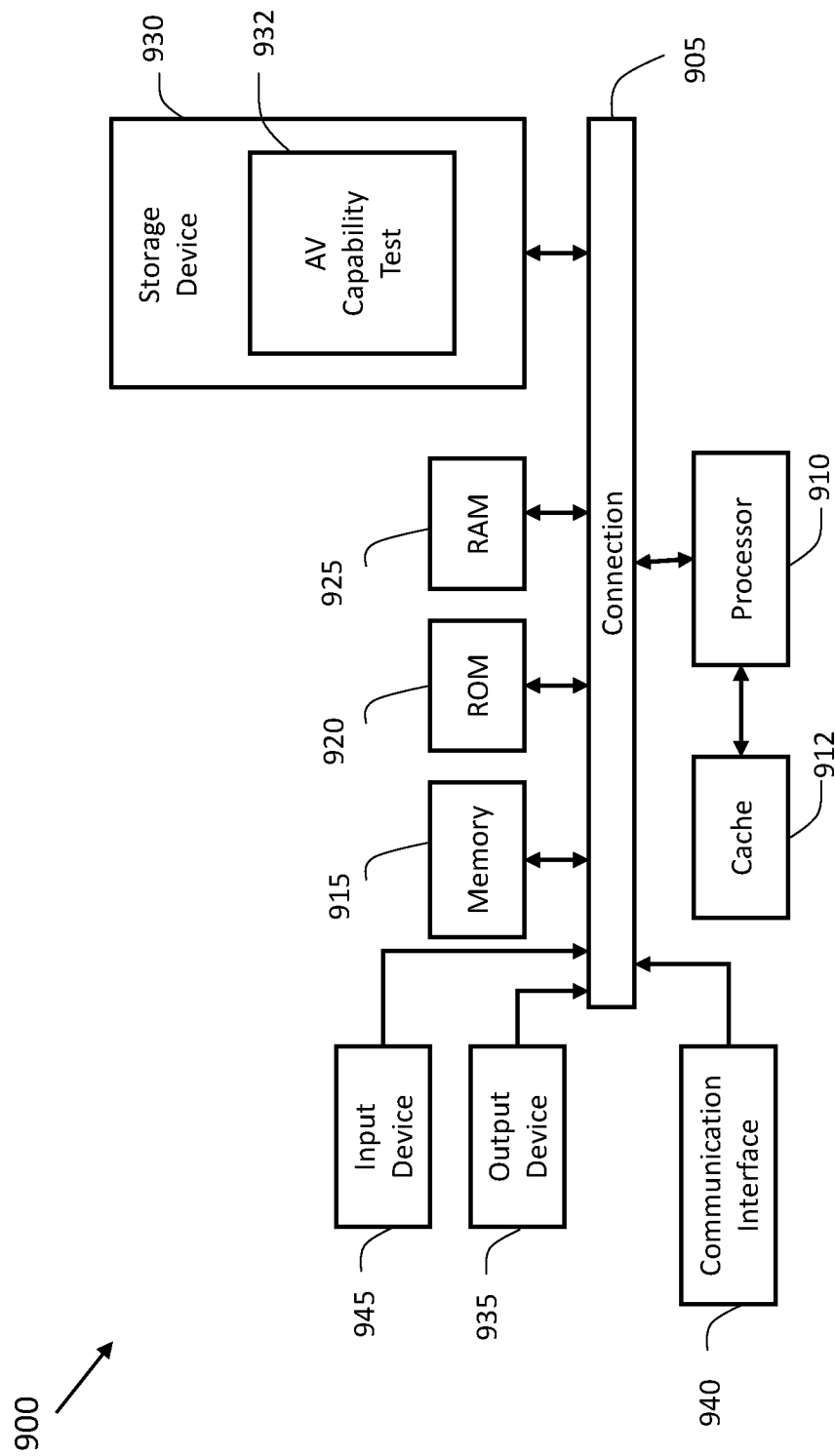
FIG. 9 illustrates an example processor-based system with which some aspects of the subject technology may be implemented.

FIG. 9 illustrates an example processor-based system with which some aspects of the subject technology may be implemented. For example, processor-based system 900 may be any computing device making up, or any component thereof in which the components of the system are in communication with each other using connection 905. Connection 905 may be a physical connection via a bus, or a direct connection into processor 910, such as in a chipset architecture. Connection 905 may also be a virtual connection, networked connection, or logical connection.

In some embodiments, computing system 900 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example system 900 includes at least one processing unit (Central Processing Unit (CPU) or processor) 910 and connection 905 that couples various system components including system memory 915, such as Read-Only Memory (ROM) 920 and Random-Access Memory (RAM) 925 to processor 910. Computing system 900 may include a cache of high-speed memory 912 connected directly with, in close proximity to, or integrated as part of processor 910.

Processor 910 may include any general-purpose processor and a hardware service or software service, such as an AV capability testing service 932 stored in storage device 930, configured to control processor 910 as well as a special-purpose processor where software instructions are incorporated into the actual processor design. The AV capability test service 932 may search and define AV capabilities using a finite parameter space with hyperplane searches as discussed herein.

Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which may represent any number of input mechanisms, such as a microphone for speech, a touch-sensitive screen for gesture or graphical input, keyboard, mouse, motion input, speech, etc. Computing system 900 may also include output device 935, which may be one or more of a number of output mechanisms known to those of skill in the art. In some instances, multimodal systems may enable a user to provide multiple types of input/output to communicate with computing system 900. Computing system 900 may include communications interface 940, which may generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 940 may also include one or more GNSS receivers or transceivers that are used to determine a location of the computing system 900 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 may be a non-volatile and/or non-transitory and/or computer-readable memory device and may be a hard disk or other types of computer-readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, RAM, Atatic RAM (SRAM), Dynamic RAM (DRAM), ROM, Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 930 may include software services, servers, services, etc., that when the code that defines such software is executed by the processor 910, it causes the system 900 to perform a function. In some embodiments, a hardware service that performs a particular function may include the software component stored in a computer-readable medium in connection with the necessary hardware components, such as processor 910, connection 905, output device 935, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices may be any available device that may be accessed by a general purpose or special purpose computer, including the functional design of any special purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in standalone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Selected Examples

Example 1 includes a computer-implemented system, including one or more non-transitory computer-readable media storing instructions, when executed by one or more processing units, cause the one or more processing units to perform operations including generating a first plurality of vehicle test scenarios, each corresponding to one of a first plurality of sampling points in an N-dimensional parameter space associated with a vehicle capability, where N is a positive integer; executing a vehicle compute process in each vehicle test scenario of the first plurality of vehicle test scenarios to generate a first test result for each respective vehicle test scenario; computing, based on the first test results, a first hyperplane in the N-dimensional parameter space; and generating, based on the first hyperplane, a second plurality of vehicle test scenarios, each corresponding to one of a second plurality of sampling points in the N-dimensional parameter space.

In Example 2, the computer-implemented system of Example 1 can optionally include where the first plurality of sampling points are non-uniformly spaced in the N-dimensional parameter space.

In Example 3, the computer-implemented system of any one of Examples 1-2 can optionally include where the first hyperplane separates the first plurality of sampling points into a first group of sampling points corresponding to test vehicle scenarios in which the vehicle compute process fails; and a second group of sampling points corresponding to test vehicle scenarios in which the vehicle compute process passes.

In Example 4, the computer-implemented system of any one of Examples 1-3 can optionally include where the generating the second plurality of vehicle test scenarios includes selecting, based on the first hyperplane, the second plurality of sampling points in the N-dimensional parameter space.

In Example 5, the computer-implemented system of any one of Examples 1-4 can optionally include where the selecting the second plurality of sampling points includes selecting the second plurality of sampling points in a subspace of the N-dimensional parameter space, the subspace being on one side of the first hyperplane.

In Example 6, the computer-implemented system of any one of Examples 1-5 can optionally include where each of the second plurality of sampling points has a shorter distance to the first hyperplane than each of the first plurality of sampling points.

In Example 7, the computer-implemented system of any one of Examples 1-6 can optionally include where the generating the first plurality of vehicle test scenarios includes configuring one or more test parameters for a first vehicle test scenario of the first plurality of vehicle test scenarios based on a first sampling point of the first plurality of sampling points in the N-dimensional parameter space.

In Example 8, the computer-implemented system of any one of Examples 1-7 can optionally include where the computing the first hyperplane is further based on a support vector machine (SVM).

In Example 9, the computer-implemented system of any one of Examples 1-8 can optionally include executing the vehicle compute process in each vehicle test scenario of the second plurality of vehicle test scenarios to generate a second test result for each respective vehicle test scenario; computing, based on the first test results and the second test results, a second hyperplane in the N-dimensional parameter space; and determining, based on the second hyperplane, a capability of the vehicle.

In Example 10, the computer-implemented system of any one of Examples 1-9 can optionally include where a value of N for the N-dimensional parameter space is at least 2.

Example 11 includes a method including selecting, by a computer-implemented system, a first plurality of sampling points in an N-dimensional parameter space associated with a vehicle capability test; classifying, by the computer-implemented system, each sampling point of the first plurality of sampling points into a first class based on a vehicle passing a test scenario associated with the respective sampling point; or a second class based on the vehicle failing the test scenario associated with the respective sampling point; and determining, by the computer-implemented system based on the classifying, a capability of the vehicle.

In Example 12, the method of Example 11 can optionally include where the selecting the first plurality of sampling points is based on a random selection in the N-dimensional parameter space.

In Example 13, the method of any one of Examples 11-12 can optionally include where the selecting the first plurality of sampling points is based on a threshold number of test scenarios.

In Example 14, the method of any one of Examples 11-13 can optionally include configuring, by the computer-implemented system, one or more test parameters for a first test scenario based on a first sampling point of the first plurality of sampling points.

In Example 15, the method of any one of Examples 11-14 can optionally include where the classifying each sampling point of the first plurality of sampling points into the first class or the second class is based on a stochastic gradient descent (SGD) classifier.

In Example 16, the method of any one of Examples 11-15 can optionally include where the classifying each sampling point of the first plurality of sampling points includes computing a first hyperplane in the N-dimensional parameter space, where the first hyperplane separates the first plurality of sampling points into the first class and the second class.

In Example 17, the method of any one of Examples 11-16 can optionally include where the computing the first hyperplane in the N-dimensional parameter space is based on a support vector machine (SVM).

In Example 18, the method of any one of Examples 11-17 can optionally include where the selecting the first plurality of sampling points is based on a second hyperplane in the N-dimensional parameter space, the second hyperplane being different from the first hyperplane.

In Example 19, the method of any one of Examples 11-18 can optionally include where the second hyperplane separates a second plurality of sampling points in the N-dimensional parameter space into the first class and the second class.

In Example 20, the method of any one of Examples 11-19 can optionally include terminating, by the computer-implemented system, the vehicle capability test based on a comparison between the first hyperplane and the second hyperplane.

In Example 21, the method of any one of Examples 11-20 can optionally include terminating, by the computer-implemented system, the vehicle capability test based on a difference between a first weight associated with the first hyperplane and a second weight associated with the second hyperplane satisfying a threshold.

In Example 22, the method of any one of Examples 11-21 can optionally include where the determining the capability of the vehicle based on the first hyperplane is responsive to a difference between the first hyperplane and the second hyperplane satisfying a threshold.

In Example 23, the method of any one of Examples 11-22 can optionally include where the N-dimensional parameter space includes dimensions associated with at least one of a vehicle position or a lane boundary.

In Example 24, the method of any one of Examples 11-23 can optionally include where the N-dimensional parameter space is associated with at least one of a path curvature or a distance from the vehicle to the path curvature; and the capability of the vehicle is associated with a navigable path curvature.

In Example 25, the method of any one of Examples 11-24 can optionally include where the N-dimensional parameter space is associated with at least one of a width of a gap, a lateral distance from the vehicle to the gap, or a longitudinal distance from the vehicle to the gap; and the capability of the vehicle is associated with a navigable gap size.

Example 26 includes a method including generating, by a computer-implemented system, a first plurality of vehicle test scenarios, each corresponding to one of a first plurality of sampling points in a multi-dimensional parameter space, the multi-dimensional parameter space having dimensions associated with at least one of a vehicle position or a lane boundary; executing, by the computer-implemented system, a vehicle compute process in each vehicle test scenario of the first plurality of vehicle test scenarios to generate a first test result for each respective vehicle test scenario; computing, by the computer-implemented system based on the first test results, a first hyperplane within the multi-dimensional parameter space; and generating, by the computer-implemented system based on the first hyperplane, a second plurality of vehicle test scenarios, each corresponding to one of a second plurality of sampling points in the multi-dimensional parameter space.

In Example 27, the method of Example 26, where the first hyperplane separates the first plurality of sampling points into a first group of sampling points corresponding to vehicle test scenarios in which the vehicle compute process fails; and a second group of sampling points corresponding to vehicle test scenarios in which the vehicle compute process passes.

In Example 28, the method of any one of Examples 26-27 can optionally include where the generating the second plurality of vehicle test scenarios includes selecting, based on the first hyperplane, the second plurality of sampling points in the multi-dimensional parameter space.

In Example 29, the method of any one of Examples 26-28 can optionally include executing the vehicle compute process in each vehicle test scenario of the second plurality of vehicle test scenarios to generate a second test result for each respective vehicle test scenario; computing, based on the first test results and the second test results, a second hyperplane in the multi-dimensional parameter space; and determining, based on the second hyperplane, a vehicle capability.

Example 30 includes an apparatus comprising means for performing the method of any of the examples 11-25.

Example 31 includes an apparatus comprising means for performing the method of any of the examples 26-29.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A computer-implemented system, comprising:
   one or more non-transitory computer-readable media storing instructions, when executed by one or more processing units, cause the one or more processing units to perform operations comprising:
   generating a first plurality of vehicle test scenarios, each corresponding to one of a first plurality of sampling points in an N-dimensional parameter space associated with a vehicle capability, wherein N is a positive integer;
   executing a vehicle compute process in each vehicle test scenario of the first plurality of vehicle test scenarios to generate a first test result for each respective vehicle test scenario, wherein executing the vehicle compute process in each vehicle test scenario of the first plurality of vehicle test scenarios includes performing perception, prediction, planning, and control algorithms of an autonomous vehicle in a simulated environment based on each vehicle test scenario of the first plurality of vehicle test scenarios to generate the first test result for each respective vehicle test scenario;
   computing, based on the first test results, a first hyperplane in the N-dimensional parameter space; and
   generating, based on the first hyperplane, a second plurality of vehicle test scenarios, each corresponding to one of a second plurality of sampling points in the N-dimensional parameter space,
   wherein generating the first plurality of vehicle test scenarios, executing the vehicle compute process for the first plurality of vehicle test scenarios, and generating the second plurality of vehicle test scenarios based on the first hyperplane tests and validates algorithms, machine learning models, and neural networks of the vehicle compute process of the autonomous vehicle for managing operation of the autonomous vehicle in a real-world environment.

2. The computer-implemented system of claim 1, wherein the first plurality of sampling points are non-uniformly spaced in the N-dimensional parameter space.

3. The computer-implemented system of claim 1, wherein the first hyperplane separates the first plurality of sampling points into:
   a first group of sampling points corresponding to test vehicle scenarios in which the vehicle compute process fails; and
   a second group of sampling points corresponding to test vehicle scenarios in which the vehicle compute process passes.

4. The computer-implemented system of claim 1, wherein the generating the second plurality of vehicle test scenarios comprises:
   selecting, based on the first hyperplane, the second plurality of sampling points in the N-dimensional parameter space.

5. The computer-implemented system of claim 4, wherein the selecting the second plurality of sampling points comprises:
   selecting the second plurality of sampling points in a subspace of the N-dimensional parameter space, the subspace being on one side of the first hyperplane.

6. The computer-implemented system of claim 1, wherein each of the second plurality of sampling points has a shorter distance to the first hyperplane than the first plurality of sampling points.

7. The computer-implemented system of claim 1, further comprising:
   executing the vehicle compute process in each vehicle test scenario of the second plurality of vehicle test scenarios to generate a second test result for each respective vehicle test scenario;
   computing, based on the first test results and the second test results, a second hyperplane in the N-dimensional parameter space; and
   determining, based on the second hyperplane, a capability of the vehicle.

8. A method comprising:
   selecting, by a computer-implemented system, a first plurality of sampling points in an N-dimensional parameter space associated with a vehicle capability test, where N is at least 2;
   classifying, by the computer-implemented system, each sampling point of the first plurality of sampling points, by executing a vehicle compute process using each sampling point of the first plurality of sampling points, including performing perception, prediction, planning, and control algorithms of an autonomous vehicle in a simulated environment based on each sampling point of the first plurality of sampling points, wherein the classes of the classification are:
      a first class based on a vehicle passing a test scenario associated with the respective sampling point; or
      a second class based on the vehicle failing the test scenario associated with the respective sampling point; and
   determining, by the computer-implemented system based on the classifying, a capability of the vehicle,
   wherein selecting the first plurality of sampling points and executing the vehicle compute process using each sampling point of the first plurality of sampling points tests and validates algorithms, machine learning models, and neural networks of the vehicle compute process of the autonomous vehicle for managing operation of the autonomous vehicle in a real-world environment.

9. The method of claim 8, wherein the classifying each sampling point of the first plurality of sampling points comprises:
   computing a first hyperplane in the N-dimensional parameter space, wherein the first hyperplane separates the first plurality of sampling points into the first class and the second class.

10. The method of claim 9, wherein the computing the first hyperplane in the N-dimensional parameter space is based on a support vector machine (SVM).

11. The method of claim 9, wherein the selecting the first plurality of sampling points is based on a second hyperplane in the N-dimensional parameter space, the second hyperplane being different from the first hyperplane.

12. The method of claim 11, wherein the second hyperplane separates a second plurality of sampling points in the N-dimensional parameter space into the first class and the second class.

13. The method of claim 11, wherein the determining the capability of the vehicle based on the first hyperplane is responsive to a difference between the first hyperplane and the second hyperplane satisfying a threshold.

14. The method of claim 8, wherein the N-dimensional parameter space comprises dimensions associated with at least one of a vehicle position or a lane boundary.

15. The method of claim 8, wherein:
   the N-dimensional parameter space is associated with at least one of a path curvature or a distance from the vehicle to the path curvature; and
   the capability of the vehicle is associated with a navigable path curvature.

16. The method of claim 8, wherein:
   the N-dimensional parameter space is associated with at least one of a width of a gap, a lateral distance from the vehicle to the gap, or a longitudinal distance from the vehicle to the gap; and
   the capability of the vehicle is associated with a navigable gap size.

17. A method comprising:
   generating, by a computer-implemented system, a first plurality of vehicle test scenarios, each corresponding to one of a first plurality of sampling points in a multi-dimensional parameter space, the multi-dimensional parameter space having dimensions associated with at least one of a vehicle position or a lane boundary;
   executing, by the computer-implemented system, a vehicle compute process in each vehicle test scenario of the first plurality of vehicle test scenarios to generate a first test result for each respective vehicle test scenario, wherein executing the vehicle compute process in each vehicle test scenario of the first plurality of vehicle test scenarios includes performing perception, prediction, planning, and control algorithms of an autonomous vehicle in a simulated environment based on each vehicle test scenario of the first plurality of vehicle test scenarios to generate the first test result for each respective vehicle test scenario;
   computing, by the computer-implemented system based on the first test results, a first hyperplane within the multi-dimensional parameter space; and
   generating, by the computer-implemented system based on the first hyperplane, a second plurality of vehicle test scenarios, each corresponding to one of a second plurality of sampling points in the multi-dimensional parameter space, wherein generating and executing the first plurality of vehicle test scenarios and generating the second plurality of vehicle test scenarios based on the first hyperplane tests and validates algorithms, machine learning models, and neural networks of the vehicle compute process of the autonomous vehicle for managing operation of the autonomous vehicle in a real-world environment.

18. The method of claim 17, wherein the first hyperplane separates the first plurality of sampling points into:
- a first group of sampling points corresponding to vehicle test scenarios in which the vehicle compute process fails; and
- a second group of sampling points corresponding to vehicle test scenarios in which the vehicle compute process passes.

19. The method of claim 17, wherein the generating the second plurality of vehicle test scenarios comprises:
selecting, based on the first hyperplane, the second plurality of sampling points in the multi-dimensional parameter space.

20. The method of claim 17, further comprising:

executing the vehicle compute process in each vehicle test scenario of the second plurality of vehicle test scenarios to generate a second test result for each respective vehicle test scenario;

computing, based on the first test results and the second test results, a second hyperplane in the multi-dimensional parameter space; and determining, based on the second hyperplane, a vehicle capability.

* * * * *